(12) United States Patent
Lee

(10) Patent No.: US 12,282,844 B2
(45) Date of Patent: Apr. 22, 2025

(54) ARTIFICIAL INTELLIGENCE ACCELERATORS

(71) Applicant: SK hynix Inc., Icheon-si (KR)

(72) Inventor: Seong Ju Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 846 days.

(21) Appl. No.: 17/503,770

(22) Filed: Oct. 18, 2021

(65) Prior Publication Data

US 2022/0374690 A1 Nov. 24, 2022

(30) Foreign Application Priority Data

May 18, 2021 (KR) .......................... 10-2021-0064088

(51) Int. Cl.

| | | |
|---|---|---|
| *G06N 3/06* | (2006.01) | |
| *G06F 7/50* | (2006.01) | |
| *G06F 7/501* | (2006.01) | |
| *G06F 7/52* | (2006.01) | |
| *G06F 7/53* | (2006.01) | |
| *G06F 9/50* | (2006.01) | |
| *G06F 9/52* | (2006.01) | |
| *G06F 9/54* | (2006.01) | |
| *G06N 3/063* | (2023.01) | |

(52) U.S. Cl.
CPC ............ *G06N 3/063* (2013.01); *G06F 7/501* (2013.01); *G06F 7/5318* (2013.01); *G06F 9/5027* (2013.01); *G06F 9/52* (2013.01); *G06F 9/544* (2013.01)

(58) Field of Classification Search
CPC ................................. G06N 3/063; G06F 7/501
See application file for complete search history.

(56) References Cited

U.S. PATENT DOCUMENTS

| | | | |
|---|---|---|---|
| 5,790,444 A | 8/1998 | Olson et al. | |
| 10,558,428 B2 | 2/2020 | Rovers | |
| 11,704,535 B1 * | 7/2023 | Vemuri | ............... G06N 3/0464 706/31 |
| 2021/0241070 A1 * | 8/2021 | Mahurin | ............... G06N 3/063 |

FOREIGN PATENT DOCUMENTS

| | | | |
|---|---|---|---|
| KR | 1019980041799 A | 8/1998 | |
| KR | 100310566 B1 | 11/2001 | |
| KR | 1020030011063 A | 2/2003 | |

* cited by examiner

*Primary Examiner* — Hal Schnee
(74) *Attorney, Agent, or Firm* — WILLIAM PARK & ASSOCIATES LTD.

(57) ABSTRACT

An artificial intelligence (AI) accelerator includes memory circuits configured to output weight data and vector data, a multiplication circuit/adder tree performing a multiplying/adding calculation on the weight data and the vector data to generate multiplication/addition result data, a first accumulator synchronized with an odd clock signal to perform an accumulative adding calculation on odd-numbered multiplication/addition result data of the multiplication/addition result data and a first latched data, and a second accumulator synchronized with an even clock signal to perform an accumulative adding calculation on even-numbered multiplication/addition result data of the multiplication/addition result data and a second latched data.

52 Claims, 20 Drawing Sheets

FIG.3

$$[W1\ W2\ W3\ W4\ W5\ W6\ \cdots\ W512] \times \begin{bmatrix} V1 \\ V2 \\ V3 \\ \vdots \\ V512 \end{bmatrix} = [MAC\_RST]$$

WEIGHT MATRIX (21)

VECTOR MATRIX (22)

RESULT MATRIX (23)

ARTIFICIAL INTELLIGENCE ACCELERATORS

CROSS-REFERENCE TO RELATED APPLICATIONS

The present application claims priority under 35 U.S.C 119(a) to Korean Application No. 10-2021-0064088, filed on May 18, 2021, which is incorporated herein by references in its entirety.

BACKGROUND

1. Technical Field

Various embodiments of the present teachings relate to artificial intelligence accelerators and, more particularly, to artificial intelligence accelerators performing an accumulating calculation.

2. Related Art

Recently, interest in artificial intelligence (AI) has been increasing not only in the information technology industry but also in the financial and medical industries. Accordingly, in various fields, the artificial intelligence, more precisely, the introduction of deep learning is considered and prototyped. In general, techniques for effectively learning deep neural networks (DNNs) or deep networks with the increased layers as compared with general neural networks to utilize the deep neural networks (DNNs) or the deep networks in pattern recognition or inference are commonly referred to as deep learning.

One of the causes of this widespread interest may be due to the improved performance of processors that perform arithmetic operations. To improve the performance of artificial intelligence, it may be necessary to increase the number of layers that constitute a neural network in the artificial intelligence to educate the artificial intelligence. This trend has continued in recent years, which has led to an exponential increase in the amount of computation that is required for the hardware that actually performs the computation. Moreover, if the artificial intelligence employs a general hardware system with a memory and a processor that are separated from each other, the performance of the artificial intelligence may be degraded due to limitation of the amount of data communication between the memory and the processor. In order to solve this problem, a processing-in-memory (PIM) device including a processor and a memory that are integrated in one semiconductor chip has been employed as an artificial intelligence accelerator. Because the PIM device directly performs arithmetic operations in the PIM device by using data that is stored in the memory of the PIM device as input data, a data processing speed in the neural network may be improved.

SUMMARY

According to an embodiment, an artificial intelligence accelerator includes memory circuits, a multiplication circuit/adder tree, a left accumulator, and a right accumulator. The memory circuits are configured to output weight data and vector data. The multiplication circuit/adder tree is configured to perform a multiplying/adding calculation on the weight data and the vector data to generate multiplication/addition result data. The left accumulator is synchronized with an odd clock signal to perform an accumulative adding calculation on odd-numbered multiplication/addition result data of the multiplication/addition result data and a left latched data. The right accumulator is synchronized with an even clock signal to perform an accumulative adding calculation on even-numbered multiplication/addition result data of the multiplication/addition result data and a right latched data.

According to another embodiment, an artificial intelligence accelerator includes memory circuits, a left multiplication/addition circuit, a right multiplication/addition circuit, an additional adder, a left accumulator, and a right accumulator. The memory circuits are configured to output weight data and vector data. The left multiplication/addition circuit is configured to perform a multiplying/adding calculation on left weight data of the weight data and left vector data of the vector data to generate left multiplication/addition result data. The right multiplication/addition circuit is configured to perform a multiplying/adding calculation on right weight data of the weight data and right vector data of the vector data to generate right multiplication/addition result data. The additional adder is configured to add the left multiplication/addition result data to the right multiplication/addition result data to generate multiplication/addition result data. The left accumulator is synchronized with an odd clock signal to perform an accumulative adding calculation on odd-numbered multiplication/addition result data of the multiplication/addition result data and a left latched data. The right accumulator is synchronized with an even clock signal to perform an accumulative adding calculation on even-numbered multiplication/addition result data of the multiplication/addition result data and a right latched data.

According to yet another embodiment, an artificial intelligence accelerator includes a plurality of memory banks, a first global buffer, a second global buffer, and a plurality of multiplication/accumulation (MAC) operators. The plurality of memory banks is configured to output weight data. Each of the plurality of memory banks includes a left memory banks and a right memory bank that are disposed separately. The first global buffer and the second global buffer are configured to output vector data. The plurality of MAC operators are disposed to be allocated to the plurality of memory banks, respectively. Each of the plurality of MAC operators includes a multiplication circuit/adder tree, a left accumulator, and a right accumulator. The multiplication circuit/adder tree is configured to perform a multiplying/adding calculation on the weight data and the vector data to generate multiplication/addition result data. The left accumulator is synchronized with an odd clock signal to perform an accumulative adding calculation on odd-numbered multiplication/addition result data of the multiplication/addition result data and a left latched data. The right accumulator is synchronized with an even clock signal to perform an accumulative adding calculation on even-numbered multiplication/addition result data of the multiplication/addition result data and a right latched data.

According to still another embodiment, an artificial intelligence accelerator includes a plurality of memory banks, a first global buffer, a second global buffer, and a plurality of multiplication/accumulation (MAC) operators. The plurality of memory banks are configured to output weight data. Each of the plurality of memory banks includes a left memory banks and a right memory bank that are disposed separately. The first global buffer and the second global buffer are configured to output vector data. The plurality of MAC operators are disposed to be allocated to the plurality of memory banks, respectively. Each of the plurality of MAC operators includes a left multiplication/addition circuit, a right multiplication/addition circuit, an additional adder, a left accumulator, and a right accumulator. The left multiplication/addition circuit is configured to perform a multiplying/adding calculation on left weight data of the weight data and left vector data of the vector data to generate left multiplication/addition result data. The right multiplication/addition circuit is configured to perform a multiplying/adding calculation on right weight data of the weight data and right vector data of the vector data to generate right multiplication/addition result data. The additional adder is configured to add the left multiplication/addition result data to the right multiplication/addition result data to generate multiplication/addition result data. The left accumulator is synchronized with an odd clock signal to perform an accumulative adding calculation on odd-numbered multiplication/addition result data of the multiplication/addition result data and a left latched data. The right accumulator is synchronized with an even clock signal to perform an accumulative adding calculation on even-numbered multiplication/addition result data of the multiplication/addition result data and a right latched data.

BRIEF DESCRIPTION OF THE DRAWINGS

Certain features of the disclosed technology are illustrated by various embodiments with reference to the attached drawings, in which:

FIG. 3 illustrates an example of a matrix multiplying calculation executed by a multiplication/accumulation (MAC) operation of the artificial intelligence accelerator of FIG. 1;

DETAILED DESCRIPTION OF THE EMBODIMENTS

Figure 1:
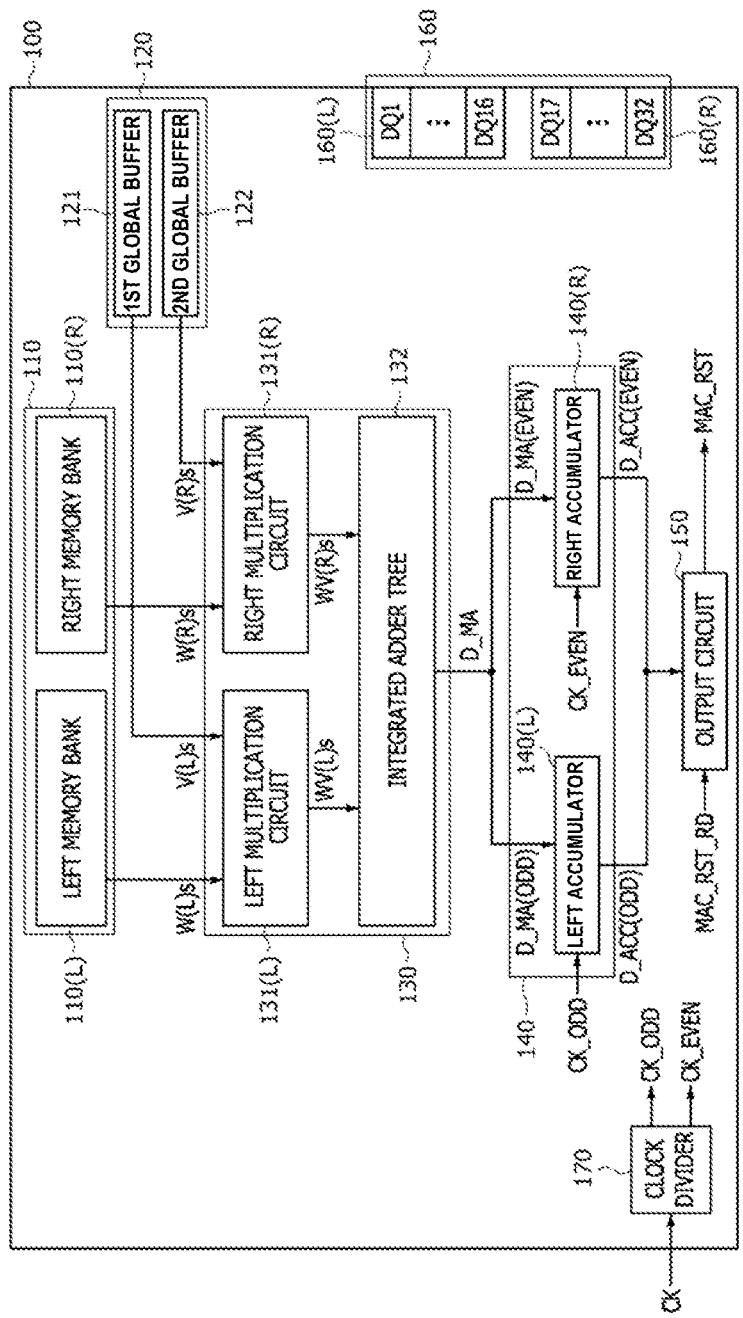
FIG. 1 is a block diagram illustrating an artificial intelligence accelerator according to an embodiment of the present disclosure.

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed. A logic "high" level and a logic "low" level may be used to describe logic levels of electric signals. A signal with a logic "high" level may be distinguished from a signal with a logic "low" level. For example, when a signal with a first voltage corresponds to a signal with a logic "high" level, a signal with a second voltage may correspond to a signal with a logic "low" level. In an embodiment, the logic "high" level may be set as a voltage level that is higher than a voltage level of the logic "low" level. Meanwhile, logic levels of signals may be set to be different or opposite according to embodiment. For example, a certain signal with a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure. Although the following embodiments are described in conjunction with dynamic random access memory (DRAM) devices, it may be apparent to those of ordinary skill in the art that the present disclosure is not limited to the DRAM devices. For example, the following embodiments may be equally applied to various memory devices such as an SRAM, a synchronous DRAM (SDRAM), a double data rate synchronous DRAM (DDR SDRAM, DDR2 SDRAM, or DDR3 SDRAM), a graphic double data rate synchronous DRAM (GDDR, GDDR2, GDDR3, or the like), a quad data rate DRAM (QDR DRAM), a Rambus extreme data rate DRAM (Rambus XDR DRAM), a fast page mode DRAM (FPM DRAM), a video DRAM (VDRAM), an extended data output DRAM (EDO DRAM), a burst extended data output DRAM (BEDO DRAM), a multibank DRAM (MDRAM), a synchronous graphic RAM (SGRAM), or another type DRAM.

Various embodiments are directed to artificial intelligence accelerators.

FIG. 1 is a block diagram illustrating an artificial intelligence (AI) accelerator 100 according to an embodiment of the present disclosure. In an embodiment, the AI accelerator 100 may have a processing-in-memory (PIM) structure that performs an arithmetic operation in a memory structural device. Alternatively, the AI accelerator 100 may have a structure of a graphic processing unit (GPU), an application specific integrated circuit (ASIC) specified to deep learning operations, or a field programmable gate array (FPGA) based on a programmable logic. Hereinafter, the following embodiments will be described in conjunction with a case in which the AI accelerator 100 performs a MAC operation. However, the following embodiments may be merely examples of the present disclosure. Accordingly, the AI accelerator 100 may be configured to perform other arithmetic operations (including an accumulative adding calculation) other than the MAC operation.

Referring to FIG. 1, the AI accelerator 100 may include a first memory circuit 110, a second memory circuit 120, a multiplication circuit/adder tree 130, an accumulative addition circuit 140, an output circuit 150, a data input/output (I/O) circuit 160, a clock divider 170.

The first memory circuit 110 may include a left memory bank 110(L) and a right memory bank 110(R) that are disposed to be physically distinguished from each other. The left memory bank 110(L) and the right memory bank 110(R) may have substantially the same memory size. The left memory bank 110(L) may store left weight data W(L)s that is used for a MAC operation, and the right memory bank 110(R) may store right weight data W(R)s that is used for the MAC operation. The left memory bank 110(L) may transmit the left weight data W(L)s to the multiplication circuit/adder tree 130 in response to a control signal that controls the MAC operation, and the right memory bank 110(R) may transmit the right weight data W(R)s to the multiplication circuit/adder tree 130 in response to a control signal that controls the MAC operation.

The second memory circuit 120 may include a first global buffer 121 and a second global buffer 122. The first global buffer 121 may store left vector data V(L)s used for the MAC operation, and the second global buffer 122 may store right vector data V(R)s used for the MAC operation. The first global buffer 121 may transmit the left vector data V(L)s to the multiplication circuit/adder tree 130 in response to a control signal that controls the MAC operation, and the second global buffer 122 may transmit the right vector data V(R)s to the multiplication circuit/adder tree 130 in response to a control signal that controls the MAC operation. Although not shown in FIG. 1, the left vector data V(L)s and the right vector data V(R)s may be transmitted from the first global buffer 121 and the second global buffer 122 to the multiplication circuit/adder tree 130 through a global data I/O line (GIO).

The multiplication circuit/adder tree 130 may perform a multiplying calculation and an adding calculation by using the weight data W(L)s and W(R)s and the vector data V(L)s ad V(R)s that are output from the first and second memory circuits 110 and 120 as input data, thereby generating and outputting multiplication/addition result data D_MA. The multiplication circuit/adder tree 130 may include a left multiplication circuit 131(L), a right multiplication circuit 131(R), and an integrated adder tree 132. The left multiplication circuit 131(L) may receive the left weight data W(L)s and the left vector data V(L)s from the left memory bank 110(L) and the first global buffer 121, respectively. The left multiplication circuit 131(L) may perform a multiplying calculation on the left weight data W(L)s and the left vector data V(L)s to generate and output left multiplication result data WV(L)s. The right multiplication circuit 131(R) may receive the right weight data W(R)s and the right vector data V(R)s from the right memory bank 110(R) and the second global buffer 122, respectively. The right multiplication circuit 131(R) may perform a multiplying calculation on the right weight data W(R)s and the right vector data V(R)s to generate and output right multiplication result data WV(R)s. The left multiplication result data WV(L)s and the right multiplication result data WV(R)s may be transmitted to the integrated adder tree 132. The integrated adder tree 132 may perform an adding calculation on the left multiplication result data WV(L)s and the right multiplication result data WV(R)s that are output from the left multiplication circuit 131(L) and the right multiplication circuit 131(R), respectively, thereby generating and outputting the multiplication/addition result data D_MA.

The accumulative addition circuit 140 may perform an accumulative adding calculation that adds the multiplication/addition result data D_MA that is output from the multiplication circuit/adder tree 130 to latched data that is generated by a previous accumulative adding calculation, thereby generating and outputting accumulated data D_ACC. The accumulative addition circuit 140 may include a left accumulator 140(L) and a right accumulator 140(R). The left accumulator 140(L) and the right accumulator 140(R) may alternately receive the multiplication/addition result data D_MA from the multiplication circuit/adder tree 130. For example, the left accumulator 140(L) may receive the odd-numbered multiplication/addition result data D_MA (ODD) from the multiplication circuit/adder tree 130, and the right accumulator 140(R) may receive the even-numbered multiplication/addition result data D_MA(EVEN) from the multiplication circuit/adder tree 130. The left accumulator 140(L) may perform an accumulative adding calculation that adds the odd-numbered multiplication/addition result data D_MA(ODD) that is output from the multiplication circuit/adder tree 130 to the latched data that is generated by a previous accumulative adding calculation, thereby generating and outputting odd-numbered accumulated data D_ACC(ODD). The accumulative adding calculation of the left accumulator 140(L) may be performed in synchronization with an odd clock signal CK_ODD. The right accumulator 140(R) may perform an accumulative adding calculation that adds the even-numbered multiplication/addition result data D_MA(EVEN) that is output from the multiplication circuit/adder tree 130 to the latched data that is generated by a previous accumulative adding calculation, thereby generating and outputting even-numbered accumulated data D_ACC(EVEN). The accumulative adding calculation of the right accumulator 140(R) may be performed in synchronization with an even clock signal CK_EVEN.

The output circuit 150 may receive the odd-numbered accumulated data D_ACC(ODD) or the even-numbered accumulated data D_ACC(EVEN) from the accumulative addition circuit 140. The output circuit 150 may output the odd-numbered accumulated data D_ACC(ODD) or the even-numbered accumulated data D_ACC(EVEN) as MAC result data MAC_RST that corresponds to a result of a final MAC operation in response to a MAC result read signal MAC_RST_RD with a first logic level such as a logic "high" level. A logic level of the MAC result read signal MAC_RST_RD may change from a logic "low" level into a logic "high" level when the odd-numbered accumulated data D_ACC(ODD) or the even-numbered accumulated data D_ACC(EVEN) that is generated by termination of the MAC operations on all of the weight data W(L)s and W(R)s and all of the vector data V(L)s and V(R)s is transmitted to the output circuit 150.

The data I/O circuit 160 may provide a means for data transmission between the AI accelerator 100 and an external device such as a host or a controller. The data I/O circuit 160 may include left data I/O terminals 160(L) and right data I/O terminals 160(R). The left data I/O terminals 160(L) may provide transmission paths of read data that is output from the left memory bank 110(L) or write data that is input to the left memory bank 110(L). In an embodiment, the left data I/O terminals 160(L) may include a plurality of data I/O terminals, for example, first to sixteenth data I/O terminals DQ1~DQ16. The right data I/O terminals 160(R) may provide transmission paths of read data that is output from the right memory bank 110(R) or write data that is input to the right memory bank 110(R). In an embodiment, the right data I/O terminals 160(R) may include a plurality of data I/O terminals, for example, seventeenth to $32^{nd}$ data I/O terminals DQ17~DQ32. The left data I/O terminals 160(L) and the right data I/O terminals 160(R) may provide transmission paths for the MAC result data MAC_RST that is output from the output circuit 150.

The clock divider 170 may divide a clock signal CK that is input to the AI accelerator 100 to generate and output the odd clock signal CK_ODD and the even clock signal CK_EVEN. The odd clock signal CK_ODD may be comprised of only odd pulses, among pulses of the clock signal CK, and the even clock signal CK_EVEN may be comprised of only even pulses among the pulses of the clock signal CK. Thus, each of the odd clock signal CK_ODD and the even clock signal CK_EVEN may have a cycle that is twice the cycle of the clock signal CK. In an embodiment, the clock divider 170 may delay the clock signal CK by a certain time to generate and output the odd clock signal CK_ODD and the even clock signal CK_EVEN with a cycle that is twice the cycle of the clock signal CK. The clock divider 170 may transmit the odd clock signal CK_ODD to the left accumulator 140(L) of the accumulative addition circuit 140 and may transmit the even clock signal CK_EVEN to the right accumulator 140(R) of the accumulative addition circuit 140.

Figure 2:
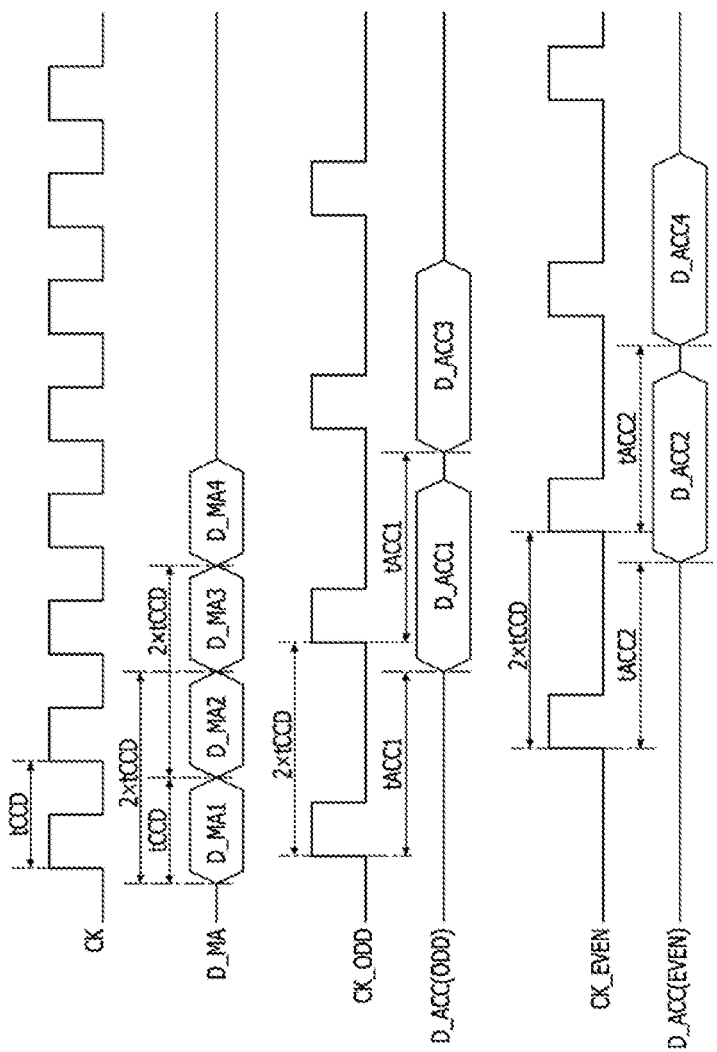
FIG. 2 is a timing diagram illustrating an accumulative adding calculation of an accumulative addition circuit included in the artificial intelligence accelerator of FIG. 1.

FIG. 2 is a timing diagram illustrating an accumulative adding calculation of the accumulative addition circuit 140 included in the AI accelerator 100 of FIG. 1. In the present embodiment, it may be assumed that the clock signal CK that is input to the clock divider 170 may have a cycle that is equal to a CAS to CAS delay time "tCCD" that corresponds to an interval time between column addresses. In addition, it may be assumed that the time it takes the multiplication circuit/adder tree 130 to perform a multiplying calculation and an adding calculation is shorter than the CAS to CAS delay time "tCCD".

Referring to FIGS. 1 and 2, first to fourth multiplication/addition result data D_MA1~D_MA4 that are output from the multiplication circuit/adder tree 130 may be alternately transmitted to the left accumulator 140(L) and the right accumulator 140(R). Thus, the odd-numbered multiplication/addition result data D_MA(ODD) (i.e., the first and third multiplication/addition result data D_MA1 and D_MA3) may be transmitted to the left accumulator 140(L), and the even-numbered multiplication/addition result data D_MA(EVEN) (i.e., the second and fourth multiplication/addition result data D_MA2 and D_MA4) may be transmitted to the right accumulator 140(R). In an embodiment, the first to fourth multiplication/addition result data D_MA1~D_MA4 may be output from the multiplication circuit/adder tree 130 at an interval time of the CAS to CAS delay time "tCCD". Accordingly, the left accumulator 140(L) may receive the first and third multiplication/addition result data D_MA1 and D_MA3 at an interval time of twice the CAS to CAS delay time "tCCD". Similarly, the right accumulator 140(R) may receive the second and fourth multiplication/addition result data D_MA2 and D_MA4 at an interval time of twice the CAS to CAS delay time "tCCD".

The left accumulator 140(L) may be synchronized with a first pulse of the odd clock signal CK_ODD to perform an accumulative adding calculation on the first multiplication/addition result data D_MA1 and the latched data. The first pulse of the odd clock signal CK_ODD may be generated at a point in time at which a certain time elapses from a point in time at which a first pulse of the clock signal CK occurs. Because a first accumulative adding calculation is performed, a latch circuit of the left accumulator 140(L) may be reset to have a value of zero as the latched data. Thus, the left accumulator 140(L) may terminate the accumulative adding calculation at a point in time at which a first accumulative addition time "tACC1" elapses from a point in time at which the first pulse of the odd clock signal CK_ODD is generated, thereby generating first accumulated data D_ACC1 as first odd-numbered accumulated data D_ACC(ODD). The first accumulative addition time "tACC1" may mean the time it takes the left accumulator 140(L) to perform an accumulative adding calculation. The first accumulated data D_ACC1 may be used as latched data during a next accumulative adding calculation of the left accumulator 140(L).

The right accumulator 140(R) may be synchronized with a first pulse of the even clock signal CK_EVEN to perform an accumulative adding calculation on the second multiplication/addition result data D_MA2 and the latched data. The first pulse of the even clock signal CK_EVEN may be generated at a point in time at which a certain time elapses from a point in time at which a second pulse of the clock signal CK occurs. Because the first accumulative adding calculation is performed, a latch circuit of the right accumulator 140(R) may also be reset to have a value of zero as the latched data. Thus, the right accumulator 140(R) may terminate the accumulative adding calculation at a point in time at which a second accumulative addition time "tACC2" elapses from a point in time at which the first pulse of the even clock signal CK_EVEN is generated, thereby generating second accumulated data D_ACC2 as first even-numbered accumulated data D_ACC(EVEN). The second accumulative addition time "tACC2" may mean the time it takes the right accumulator 140(R) to perform an accumulative adding calculation. The second accumulated data D_ACC2 may be used as latched data during a next accumulative adding calculation of the right accumulator 140(R).

The left accumulator 140(L) may be synchronized with a second pulse of the odd clock signal CK_ODD to perform an accumulative adding calculation on the third multiplication/addition result data D_MA3 and the latched data (i.e., the first accumulated data D_ACC1). The second pulse of the odd clock signal CK_ODD may be generated at a point in time at which a certain time elapses from a point in time at which a third pulse of the clock signal CK occurs. The left accumulator 140(L) may terminate the accumulative adding calculation at a point in time at which the first accumulative addition time "tACC1" elapses from a point in time at which the second pulse of the odd clock signal CK_ODD is generated, thereby generating third accumulated data D_ACC3 as second odd-numbered accumulated data D_ACC(ODD). The third accumulated data D_ACC3 may be used as latched data during a next accumulative adding calculation of the left accumulator 140(L).

The right accumulator 140(R) may be synchronized with a second pulse of the even clock signal CK_EVEN to perform an accumulative adding calculation on the fourth multiplication/addition result data D_MA4 and the latched data (i.e., the second accumulated data D_ACC2). The second pulse of the even clock signal CK_EVEN may be generated at a point in time at which a certain time elapses from a point in time at which a fourth pulse of the clock signal CK occurs. The right accumulator 140(R) may terminate the accumulative adding calculation at a point in time at which the second accumulative addition time "tACC2" elapses from a point in time at which the second pulse of the even clock signal CK_EVEN is generated, thereby generating fourth accumulated data D_ACC4 as second even-numbered accumulated data D_ACC(EVEN). The fourth accumulated data D_ACC4 may be used as latched data during a next accumulative adding calculation of the right accumulator 140(R).

As described above, the first accumulative addition time "tACC1" it takes the left accumulator 140(L) to perform the accumulative adding calculation may be longer than the CAS to CAS delay time "tCCD" and may be shorter than twice the CAS to CAS delay time "tCCD". Similarly, the second accumulative addition time tACC2" it takes the right accumulator 140(R) to perform the accumulative adding calculation may also be longer than the CAS to CAS delay time "tCCD" and may be shorter than twice the CAS to CAS delay time "tCCD". In general, in the event that the multiplication/addition result data D_MA are generated at an interval time of the CAS to CAS delay time "tCCD" and the accumulative addition time "tACC" is longer than the CAS to CAS delay time "tCCD", a point in time at which the multiplication/addition result data D_MA are transmitted to an accumulative adder of an accumulator is inconsistent with a point in time at which the latched data are transmitted to the accumulative adder of the accumulator. Thus, in such a case, it may be necessary to adjust the CAS to CAS delay time "tCCD" during the MAC operation. However, in case of the AI accelerator 100 according to the present embodiment, the left accumulator 140(L) and the right accumulator 140(R) may perform an accumulative adding calculation within the first accumulative addition time "tACC1" and the second accumulative addition time "tACC2", which are shorter than twice the CAS to CAS delay time "tCCD", respectively. Thus, it may be unnecessary to adjust the CAS to CAS delay time "tCCD" during the MAC operation. In addition, in the event that each memory bank is divided into the left memory bank 110(L) and the right memory bank 110(R), a left MAC operator and a right MAC operator may be disposed to be allocated to the left memory bank 110(L) and the right memory bank 110(R), respectively. Each of the left MAC operator and the right MAC operator may include an accumulator. In the AI accelerator 100 according to the present embodiment, the left accumulator 140(L) may be realized by using an accumulator that is included in the left MAC operator, and the right accumulator 140(R) may be realized by using an accumulator that is included in the right MAC operator. Thus, it may be unnecessary to additionally dispose accumulators occupying a relatively large area in the AI accelerator 100. Accordingly, it may be possible to realize compact AI accelerators.

FIG. 3 illustrates an example of a matrix multiplying calculation that is executed by a MAC operation of the AI accelerator 100 of FIG. 1. Referring to FIG. 3, the AI accelerator 100 may perform a matrix-vector multiplying calculation on a weight matrix 21 and a vector matrix 22 to generate a result matrix 23. The present embodiment will be described in conjunction with a case in which the weight matrix 21 is a '1×512' matrix with one row and 512 columns, the vector matrix 22 is a '512×1' matrix with 512 rows and one column, and the result matrix 23 is a '1×1' matrix with one row and one column. The weight matrix 21 may have 512 elements that correspond to 512 sets of weight data W1~W512 (i.e., first to 512$^{th}$ weight data W1~W512). The vector matrix 22 may also have 512 elements that correspond to 512 sets of vector data V1~V512 (i.e., first to 512$^{th}$ vector data V1~V512). The result matrix 23 may have one element that corresponds to one set of the MAC result data MAC_RST. The MAC result data MAC_RST of the result matrix 23 may be generated by a matrix-vector multiplying calculation on the weight data W1~W512 and the vector data V1~V512. Hereinafter, it may be assumed that each of the first to 512$^{th}$ weight data W1~W512 and each of the first to 512$^{th}$ vector data V1~V512 have an IEEE 754 format (i.e., 32-bit single-precision floating-point format).

Figure 4:
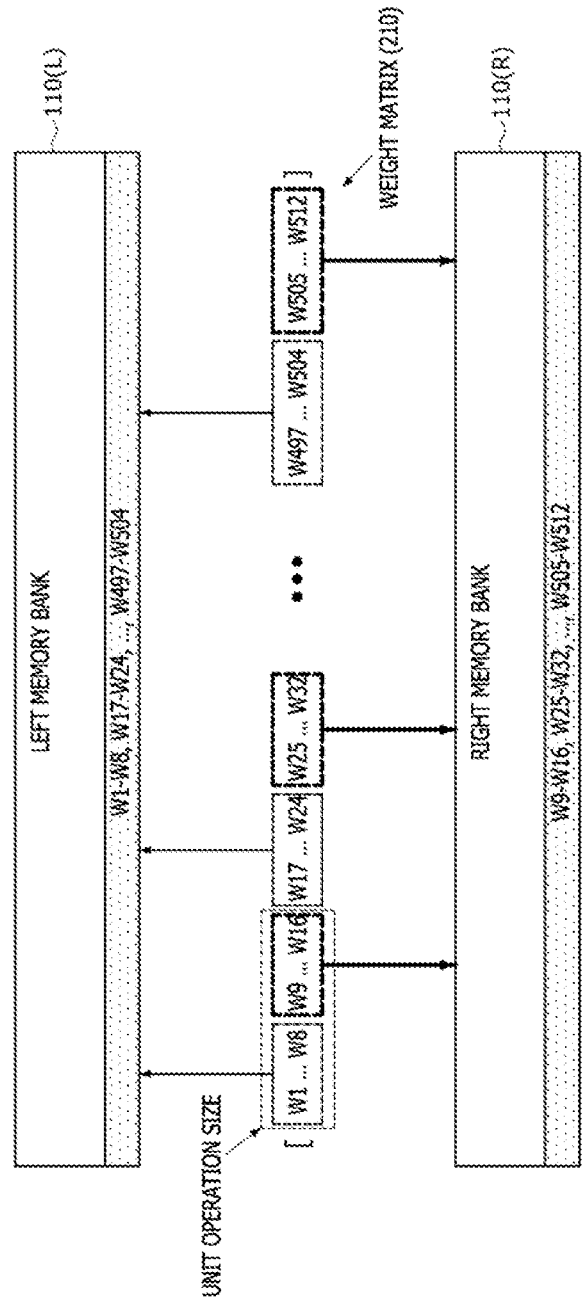
FIG. 4 illustrates a process of storing weight data in FIG. 3 into a left memory bank and a right memory bank included in the artificial intelligence accelerator of FIG. 1.

FIG. 4 illustrates a process of storing the weight data W1~W512 of FIG. 3 into the left memory bank 110(L) and the right memory bank 110(R) included in the AI accelerator 100 of FIG. 1. As described with reference to FIG. 1, the weight data W1~W512 that are used for the MAC operation may be stored in the left memory bank 110(L) and the right memory bank 110(R). Hereinafter, the weight data that is stored in the left memory bank 110(L) will be referred to as 'left weight data', and the weight data that is stored in the right memory bank 110(R) will be referred to as 'right weight data'.

Referring to FIG. 4, the weight data W1~W512 of the weight matrix 21, illustrated in FIG. 3, may be evenly allocated to the left memory bank 110(L) and the right memory bank 110(R) by a unit operation size. The unit operation size may be defined as the size of the weigh data (or the vector data) that is used for a single MAC operation of the AI accelerator 100, illustrated in FIG. 1. The unit operation size may be determined according to a hardware configuration of the multiplication circuit/adder tree 130 that is included in the AI accelerator 100. Hereinafter, it may be assumed that a size (i.e., the unit operation size) of the weight data that is processed by a single arithmetic operation of the multiplication circuit/adder tree 130 is 512 bits. As described with reference to FIG. 3, because each set of the plural sets of the weight data W1~W512 and the plural sets of the vector data V1~V512 has 32 bits, 16 sets of the weight data may be processed by a single MAC operation of the AI accelerator 100. In such a case, the first to 512$^{th}$ weight data W1~W512 may be evenly allocated to both of the left memory bank 110(L) and the right memory bank 110(R) in units of 16 sets of the weight data.

Specifically, a first group of 16 sets of the weight data (i.e., the first to sixteenth weight data W1~W16) may be evenly allocated to and stored in the left memory bank 110(L) and the right memory bank 110(R). That is, the first to eighth weight data W1~W8 may be stored in the left memory bank 110(L), and the ninth to sixteenth weight data W9~W16 may be stored in the right memory bank 110(R). A second group of 16 sets of the weight data (i.e., the seventeenth to 32nd weight data W17~W32) may also be evenly allocated to and stored in the left memory bank 110(L) and the right memory bank 110(R). That is, the seventeenth to 24th weight data W17~W24 may be stored in the left memory bank 110(L), and the 25th to 32nd weight data W25~W32 may be stored in the right memory bank 110(R). Similarly, a 32nd group of 16 sets of the weight data (i.e., the 497th to 512th weight data W497~W512) may also be evenly allocated to and stored in the left memory bank 110(L) and the right memory bank 110(R). That is, the 497th to 504th weight data W497~W504 may be stored in the left memory bank 110(L), and the 505th to 512th weight data W505~W512 may be stored in the right memory bank 110(R).

Figure 5:
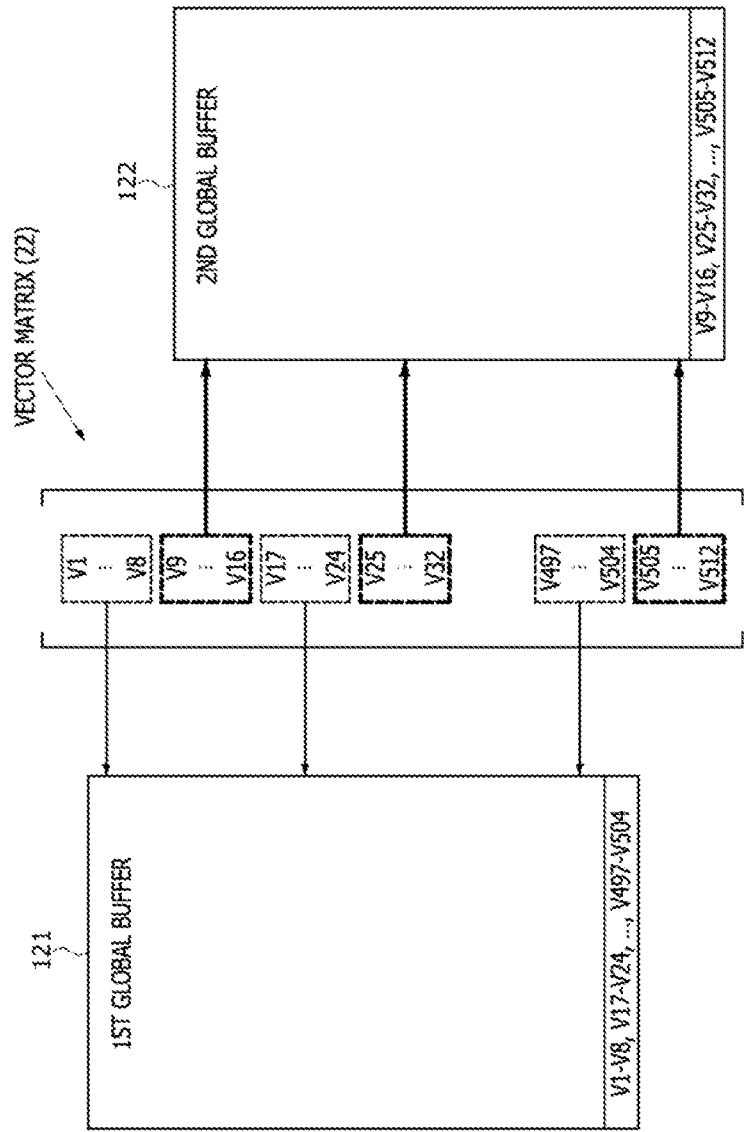
FIG. 5 illustrates a process of storing vector data in FIG. 3 into a first global buffer and a second global buffer included in the artificial intelligence accelerator of FIG. 1.

FIG. 5 illustrates a process of storing the vector data V1~V512 of FIG. 3 into the first global buffer 121 and the second global buffer 122 included in the AI accelerator 100 of FIG. 1. Referring to FIG. 5, the vector data V1~V512 constituting the vector matrix 22 illustrated in FIG. 3 may be evenly allocated to the first global buffer 121 and the second global buffer 122 by the unit operation size. Because the unit operation size is defined as 512 bits in the present embodiment, the first to 512th vector data V1~V512 may be evenly allocated to both of the first global buffer 121 and the second global buffer 122 in units of 16 sets of the vector data. Specifically, a first group of 16 sets of the vector data (i.e., the first to sixteenth vector data V1~V16) may be evenly allocated to and stored in the first global buffer 121 and the second global buffer 122. That is, the first to eighth vector data V1~V8 may be stored in the first global buffer 121, and the ninth to sixteenth vector data V9~V16 may be stored in the second global buffer 122. A second group of 16 sets of the vector data (i.e., the seventeenth to 32nd vector data V17~V32) may also be evenly allocated to and stored in the first global buffer 121 and the second global buffer 122. That is, the seventeenth to 24th vector data V17~V24 may be stored in the first global buffer 121, and the 25th to 32nd vector data V25~V32 may be stored in the second global buffer 122. Similarly, a 32nd group of 16 sets of the vector data (i.e., the 497th to 512th vector data V497~V512) may also be evenly allocated to and stored in the first global buffer 121 and the second global buffer 122. That is, the 497th to 504th vector data V497~V504 may be stored in the first global buffer 121, and the 505th to 512th vector data V505~V512 may be stored in the second global buffer 122.

In case of the present embodiment, because a single MAC operation is performed by using 16 sets of the weight data and 16 sets of the vector data as input data, it may be necessary to iteratively perform the MAC operation 32 times in order to generate the MAC result data MAC_RST of the result matrix 23 illustrated in FIG. 3. A first MAC operation of the 32 MAC operations may be performed by using the first group of 16 sets of the weight data W1~W16 and the first group of 16 sets of the vector data V1~V16 as input data. In such a case, the left memory bank 110(L) may transmit the first to eight weight data W1~W8 to the left multiplication circuit 131(L), and the right memory bank 110(R) may transmit the ninth to sixteenth weight data W9~W16 to the right multiplication circuit 131(R). In addition, the first global buffer 121 may transmit the first to eight vector data V1~V8 to the left multiplication circuit 131(L), and the second global buffer 122 may transmit the ninth to sixteenth vector data V9~V16 to the right multiplication circuit 131(R).

A second MAC operation of the 32 MAC operations may be performed by using the second group of 16 sets of the weight data W17~W32 and the second group of 16 sets of the vector data V17~V32 as input data. In such a case, the left memory bank 110(L) may transmit the seventeenth to 24$^{th}$ weight data W17~W24 to the left multiplication circuit 131(L), and the right memory bank 110(R) may transmit the 25$^{th}$ to 32$^{nd}$ weight data W25~W32 to the right multiplication circuit 131(R). In addition, the first global buffer 121 may transmit the seventeenth to 24$^{th}$ vector data V17~V24 to the left multiplication circuit 131(L), and the second global buffer 122 may transmit the 25$^{th}$ to 32$^{nd}$ vector data V25~V32 to the right multiplication circuit 131(R). Similarly, a 32$^{nd}$ MAC operation that corresponds to the last MAC operation of the 32 MAC operations may be performed by using the 32$^{nd}$ group of 16 sets of the weight data W497~W512 and the 32$^{nd}$ group of 16 sets of the vector data V497~V512 as input data. In such a case, the left memory bank 110(L) may transmit the 497$^{th}$ to 504$^{th}$ weight data W497~W504 to the left multiplication circuit 131(L), and the right memory bank 110(R) may transmit the 505$^{th}$ to 512$^{th}$ weight data W505~W512 to the right multiplication circuit 131(R). In addition, the first global buffer 121 may transmit the 497$^{th}$ to 504$^{th}$ vector data V497~V504 to the left multiplication circuit 131(L), and the second global buffer 122 may transmit the 505$^{th}$ to 512$^{th}$ vector data V505~V512 to the right multiplication circuit 131(R).

Figure 6:
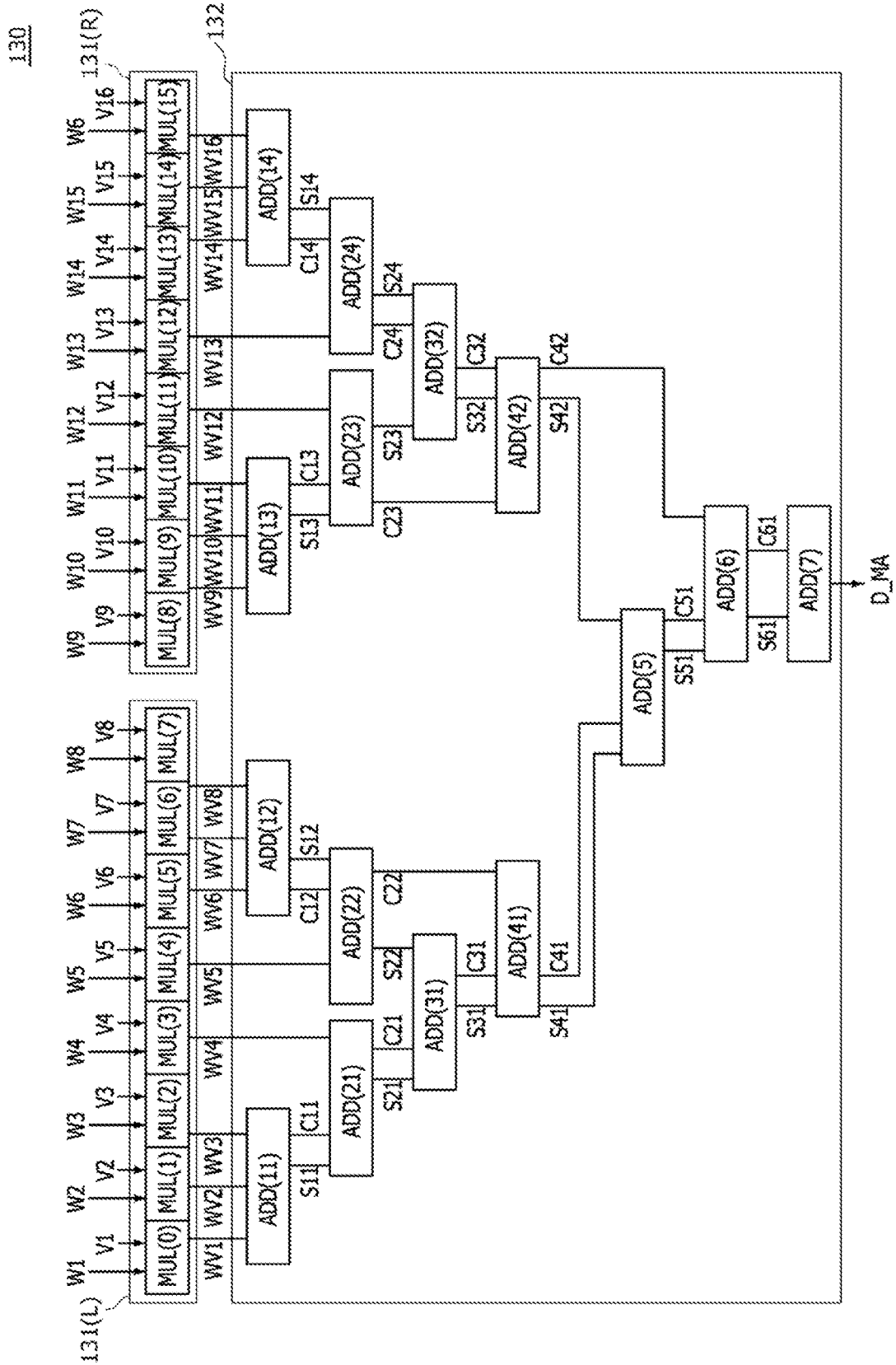
FIG. 6 is a block diagram illustrating an example of configurations and operations of a left multiplication circuit, a right multiplication circuit, and an integrated adder tree included in the artificial intelligence accelerator of FIG. 1.

FIG. 6 is a block diagram illustrating an example of configurations and operations of the left multiplication circuit 131(L), the right multiplication circuit 131(R), and the integrated adder tree 132 included in the AI accelerator 100 of FIG. 1. Referring to FIG. 6, the left multiplication circuit 131(L) may include a plurality of multipliers, for example, first to eighth multipliers MUL(0)~MUL(7). The first to eighth multipliers MUL(0)~MUL(7) may receive the first to eighth weight data W1~W8 from the left memory bank 110(L), respectively. In addition, the first to eighth multipliers MUL(0)~MUL(7) may receive the first to eighth vector data V1~V8 from the first global buffer (121 of FIG. 1), respectively. The first to eighth weight data W1~W8 may constitute the left weight data W(L)s described with reference to FIG. 1, and the first to eighth vector data V1~V8 may constitute the left vector data V(L)s described with reference to FIG. 1. The right multiplication circuit 131(R) may include a plurality of multipliers, for example, ninth to sixteenth multipliers MUL(8)~MUL(15). The ninth to sixteenth multipliers MUL(8)~MUL(15) may receive the ninth to sixteenth weight data W9~W16 from the right memory bank 110(R), respectively. In addition, the ninth to sixteenth multipliers MUL(8)~MUL(15) may receive the ninth to sixteenth vector data V9~V16 from the second global buffer (122 of FIG. 1), respectively. The ninth to sixteenth weight data W9~W16 may constitute the right weight data W(R)s, described with reference to FIG. 1, and the ninth to sixteenth vector data V9~V16 may constitute the right vector data V(R)s, described with reference to FIG. 1.

The first to eighth multipliers MUL(0)~MUL(7) of the left multiplication circuit 131(L) may perform multiplying calculations on the first to eighth weight data W1~W8 and the first to eighth vector data V1~V8 to generate first to eighth multiplication result data WV1~WV8. For example, the first multiplier MUL(0) may perform a multiplying calculation on the first weight data W1 and the first vector data V1 to generate the first multiplication result data WV1, and the second multiplier MUL(1) may perform a multiplying calculation on the second weight data W2 and the second vector data V2 to generate the second multiplication result data WV2. In the same way, the third to eighth multipliers MUL(2)~MUL(7) may also perform multiplying calculations on the third to eighth weight data W3~W8 and the third to eighth vector data V3~V8 to generate the third to eighth multiplication result data WV3~WV8. The first to eighth multiplication result data WV1~WV8 that are output from the first to eighth multipliers MUL(0)~MUL(7) may be transmitted to the integrated adder tree 132.

The ninth to sixteenth multipliers MUL(8)~MUL(15) of the right multiplication circuit 131(R) may perform multiplying calculations on the ninth to sixteenth weight data W9~W15 and the ninth to sixteenth vector data V9~V16 to generate ninth to sixteenth multiplication result data WV9~WV16. For example, the ninth multiplier MUL(8) may perform a multiplying calculation on the ninth weight data W9 and the ninth vector data V9 to generate the ninth multiplication result data WV9, and the tenth multiplier MUL(9) may perform a multiplying calculation on the tenth weight data W10 and the tenth vector data V10 to generate the tenth multiplication result data WV10. In the same way, the eleventh to sixteenth multipliers MUL(10)~MUL(15) may also perform multiplying calculations on the eleventh to sixteenth weight data W11~W16 and the eleventh to sixteenth vector data V11~V16 to generate the eleventh to sixteenth multiplication result data WV11~WV16. The ninth to sixteenth multiplication result data WV9~WV16 that are output from the ninth to sixteenth multipliers MUL(8)~MUL(15) may be transmitted to the integrated adder tree 132.

The integrated adder tree 312 may perform an adding calculation on the first to eighth multiplication result data WV1~WV8 that are output from the left multiplication circuit 131(L) and an adding calculation on the ninth to sixteenth multiplication result data WV9~WV16 that are output from the right multiplication circuit 131(R). The integrated adder tree 312 may output the multiplication/addition result data D_MA as a result of the adding calculations. The integrated adder tree 312 may include a plurality of adders ADDs that are arrayed to have a hierarchical structure, such as a tree structure. In the present embodiment, the integrated adder tree 312 may be comprised of a plurality of full-adders and a half-adder. However, the present embodiment is merely an example of the present disclosure. Accordingly, in some other embodiments, the integrated adder tree 312 may be comprised of only a plurality of half-adders. In the present embodiment, four full-adders ADD(11)~ADD(14) may be disposed in a first stage that is located at a highest level of the integrated adder tree 312, and four full-adders ADD(21)~ADD(24) may also be disposed in a second stage that is located at a second highest level of the integrated adder tree 312. In addition, two full-adders ADD(31) and ADD(32) may be disposed in a third stage that is located at a third highest level of the integrated adder tree 312, and two full-adders ADD(41) and ADD(42) may also be disposed in a fourth stage that is located at a fourth highest level of the integrated adder tree 312. Moreover, one full-adder ADD(5) may be disposed in a fifth stage that is located at a fifth highest level of the integrated adder tree 312, and one full-adder ADD(6) may also be disposed in a sixth stage that is located at a sixth highest level of the integrated adder tree 312. Furthermore, one half-adder ADD(7) may be disposed in a seventh stage that is located at a lowest level of the integrated adder tree 312.

The first full-adder ADD(11) in the first stage may perform an adding calculation on the first to third multiplication result data WV1~WV3 that are output from the first to third multipliers MUL(0)~MUL(2) of the left multiplication circuit 131(L), thereby generating and outputting added data S11 and a carry C11. The second full-adder ADD(12) in the first stage may perform an adding calculation on the sixth to eighth multiplication result data WV6~WV8 that are output from the sixth to eighth multipliers MUL(5)~MUL(7) of the left multiplication circuit 131(L), thereby generating and outputting added data S12 and a carry C12. The third full-adder ADD(13) in the first stage may perform an adding calculation on the ninth to eleventh multiplication result data WV9~WV11 that are output from the ninth to eleventh multipliers MUL(8)~MUL(10) of the right multiplication circuit 131(R), thereby generating and outputting added data S13 and a carry C13. The fourth full-adder ADD(14) in the first stage may perform an adding calculation on the fourteenth to sixteenth multiplication result data WV14~WV16 that are output from the fourteenth to sixteenth multipliers MUL(13)~MUL(15) of the right multiplication circuit 131(R), thereby generating and outputting added data S14 and a carry C14.

The first full-adder ADD(21) in the second stage may perform an adding calculation on the added data S11 and the carry C11 that are output from the first full-adder ADD(11) in the first stage and the fourth multiplication result data WV4 that is output from the fourth multiplier MUL(3) of the left multiplication circuit 131(L), thereby generating and outputting added data S21 and a carry C21. The second full-adder ADD(22) in the second stage may perform an adding calculation on the added data S12 and the carry C12 that are output from the second full-adder ADD(12) in the first stage and the fifth multiplication result data WV5 that is output from the fifth multiplier MUL(4) of the left multiplication circuit 131(L), thereby generating and outputting added data S22 and a carry C22. The third full-adder ADD(23) in the second stage may perform an adding calculation on the added data S13 and the carry C13 that are output from the third full-adder ADD(13) in the first stage and the twelfth multiplication result data WV12 that is output from the twelfth multiplier MUL(11) of the right multiplication circuit 131(R), thereby generating and outputting added data S23 and a carry C23. The fourth full-adder ADD(24) in the second stage may perform an adding calculation on the added data S14 and the carry C14 that are output from the fourth full-adder ADD(14) in the first stage and the thirteenth multiplication result data WV13 that is output from the thirteenth multiplier MUL(12) of the right multiplication circuit 131(R), thereby generating and outputting added data S24 and a carry C24.

The first full-adder ADD(31) in the third stage may perform an adding calculation on the added data S21 and the carry C21 that are output from the first full-adder ADD(21) in the second stage and the added data S22 that is output from the second full-adder ADD(22) in the second stage, thereby generating and outputting added data S31 and a carry C31. The second full-adder ADD(32) in the third stage may perform an adding calculation on the added data S23 that is output from the third full-adder ADD(23) in the second stage and the added data S24 and the carry C24 that are output from the fourth full-adder ADD(24) in the second stage, thereby generating and outputting added data S32 and a carry C32.

The first full-adder ADD(41) in the fourth stage may perform an adding calculation on the added data S31 and the carry C31 that are output from the first full-adder ADD(31) in the third stage and the carry C(22) that is output from the second full-adder ADD(22) in the second stage, thereby generating and outputting added data S41 and a carry C41. The second full-adder ADD(42) in the fourth stage may perform an adding calculation on the carry (C23) that is output from the third full-adder ADD(23) in the second stage and the added data S32 and the carry C32 that are output from the second full-adder ADD(32) in the third stage, thereby generating and outputting added data S42 and a carry C42.

The full-adder ADD(5) in the fifth stage may perform an adding calculation on the added data S41 and the carry C41 that are output from the first full-adder ADD(41) in the fourth stage and the added data S42 that are output from the second full-adder ADD(42) in the fourth stage, thereby generating and outputting added data S51 and a carry C51. The full-adder ADD(6) in the sixth stage may perform an adding calculation on the added data S51 and the carry C51 that are output from the full-adder ADD(5) in the fifth stage and the carry C42 that are output from the second full-adder ADD(42) in the fourth stage, thereby generating and outputting added data S61 and a carry C61. The half-adder ADD(7) in the seventh stage may perform an adding calculation on the added data S61 and the carry C61 that are output from the full-adder ADD(6) in the sixth stage, thereby generating and outputting the multiplication/addition result data D_MA. The multiplication/addition result data D_MA that is output from the half-adder ADD(7) in the seventh stage may be transmitted to the accumulative addition circuit 140.

Figure 7:
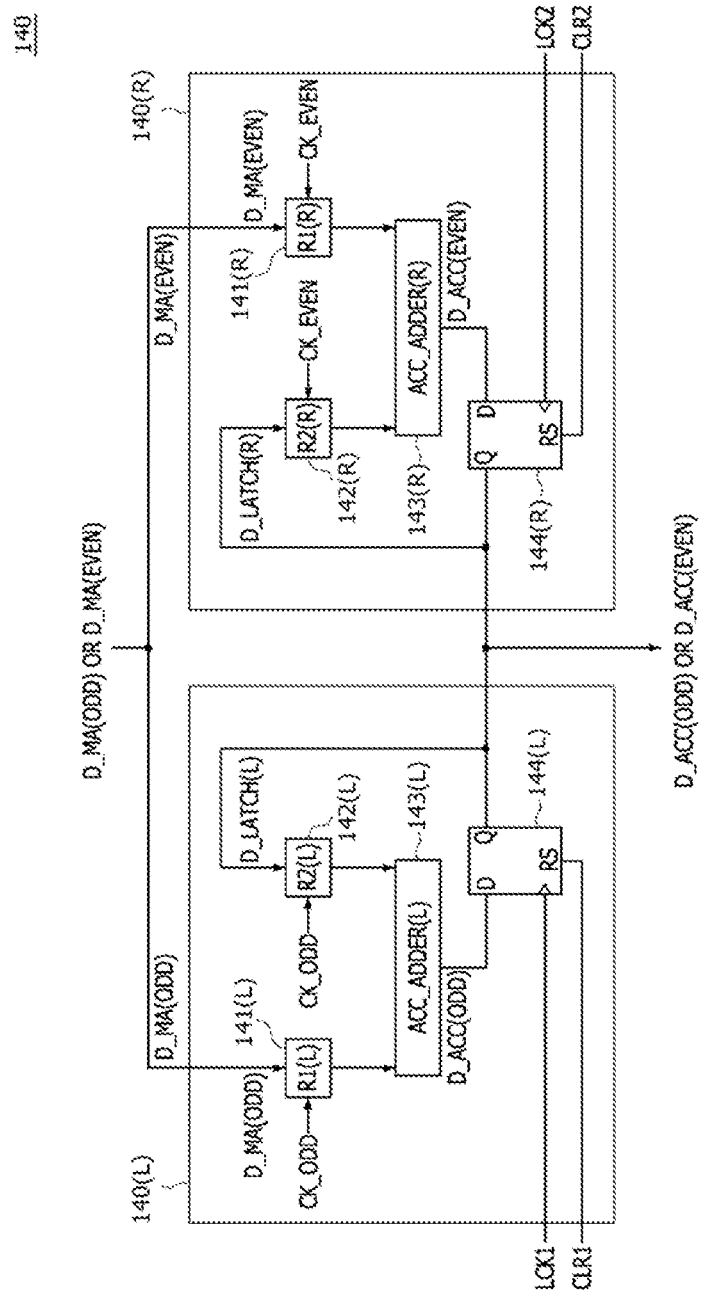
FIG. 7 is a block diagram illustrating an example of configurations and operations of a left accumulator and a right accumulator constituting an accumulative addition circuit included in the artificial intelligence accelerator of FIG. 1.

FIG. 7 is a block diagram illustrating an example of configurations and operations of the left accumulator 140(L) and the right accumulator 140(R) constituting the accumulative addition circuit 140 included in the AI accelerator 100 of FIG. 1. Referring to FIG. 7, the left accumulator 140(L) may include a first left register (R1(L)) 141(L), a second left register (R2(L)) 142(L), a left accumulative adder (ACC_ADDER(L)) 143(L), and a left latch circuit 144(L). The first left register 141(L) may receive the odd-numbered multiplication/addition result data D_MA(ODD) from the multiplication circuit/adder tree (130 of FIG. 1). The first left register 141(L) may be synchronized with the odd clock signal CK_ODD that is output from the clock divider (170 of FIG. 1) to transmit the odd-numbered multiplication/addition result data D_MA(ODD) to the left accumulative adder 143(L). The second left register 142(L) may receive left latched data D_LATCH(L) from the left latch circuit 144(L). The left latched data D_LATCH(L) may correspond to the odd-numbered accumulated data D_ACC(ODD) that are transmitted from the left accumulative adder 143(L) to the left latch circuit 144(L) and are latched by the left latch circuit 144(L) during a previous MAC operation. The second left register 142(L) may be synchronized with the odd clock signal CK_ODD that is output from the clock divider (170 of FIG. 1) to transmit the left latched data D_LATCH (L) to the left accumulative adder 143(L). In an embodiment, the second left register 142(L) may include an implied bit datum of "1" in the left latched data D_LATCH(L) and may transmit the left latched data D_LATCH(L) with the implied bit datum to the left accumulative adder 143(L). In an embodiment, each of the first left register 141(L) and the second left register 142(L) may include at least one flip-flop.

The left accumulative adder 143(L) may perform an adding calculation on the odd-numbered multiplication/addition result data D_MA(ODD) that is output from the first left register 141(L) and the left latched data D_LATCH (L) that is output from the second left register 142(L) to generate the odd-numbered accumulated data D_ACC (ODD). The left accumulative adder 143(L) may transmit the odd-numbered accumulated data D_ACC(ODD) to an input terminal D of the left latch circuit 144(L). The left latch circuit 144(L) may latch the odd-numbered accumulated data D_ACC(ODD), which are input through the input terminal D, in response to a first latch clock signal LCK1 with a first logic level (e.g., a logic "high" level) that is input to a clock terminal of the left latch circuit 144(L). In addition, the left latch circuit 144(L) may output the latched data of the odd-numbered accumulated data D_ACC(ODD) through an output terminal Q of the left latch circuit 144(L) in response to the first latch clock signal LCK1 with the first logic level (e.g., a logic "high" level). The output data of the left latch circuit 144(L) may be fed back to the second left register 142(L) and may also be transmitted to the output circuit (150 of FIG. 1). When the left latch circuit 144(L) terminates latch operations of the MAC operations, the left latch circuit 144(L) may be reset in response to a first clear signal CLR1 with a logic "high" level.

The right accumulator 140(R) may include a first right register (R1(R)) 141(R), a second right register (R2(R)) 142(R), a right accumulative adder (ACC_ADDER(R)) 143 (R), and a right latch circuit 144(R). The first right register 141(R) may receive the even-numbered multiplication/addition result data D_MA(EVEN) from the multiplication circuit/adder tree (130 of FIG. 1). The first right register 141(R) may be synchronized with the even clock signal CK_EVEN that is output from the clock divider (170 of FIG. 1) to transmit the even-numbered multiplication/addition result data D_MA(EVEN) to the right accumulative adder 143(R). The second right register 142(R) may receive right latched data D_LATCH(R) from the right latch circuit 144(R). The right latched data D_LATCH(R) may correspond to the even-numbered accumulated data D_ACC (EVEN), which are transmitted from the right accumulative adder 143(R) to the right latch circuit 144(R) and are latched by the right latch circuit 144(R) during a previous MAC operation. The second right register 142(R) may be synchronized with the even clock signal CK_EVEN that is output from the clock divider (170 of FIG. 1) to transmit the right latched data D_LATCH(R) to the right accumulative adder 143(R). In an embodiment, the second right register 142(R) may include an implied bit datum of "1" in the right latched data D_LATCH(R) and may transmit the right latched data D_LATCH(R) with the implied bit datum to the right accumulative adder 143(R). In an embodiment, each of the first right register 141(R) and the second right register 142(R) may include at least one flip-flop.

The right accumulative adder 143(R) may perform an adding calculation on the even-numbered multiplication/addition result data D_MA(EVEN) that is output from the first right register 141(R) and the right latched data D_LATCH(R) that is output from the second right register 142(R) to generate the even-numbered accumulated data D_ACC(EVEN). The right accumulative adder 143(R) may transmit the even-numbered accumulated data D_ACC(EVEN) to an input terminal D of the right latch circuit 144(R). The right latch circuit 144(R) may latch the even-numbered accumulated data D_ACC(EVEN), which are input through the input terminal D, in response to a second latch clock signal LCK2 with the first logic level (e.g., a logic "high" level) that is input to a clock terminal of the right latch circuit 144(R). In addition, the right latch circuit 144(R) may output the latched data of the even-numbered accumulated data D_ACC(EVEN) through an output terminal Q of the right latch circuit 144(R) in response to the second latch clock signal LCK2 with the first logic level (e.g., a logic "high" level). Output data of the right latch circuit 144(R) may be fed back to the second right register 142(R) and may also be transmitted to the output circuit (150 of FIG. 1). When the right latch circuit 144(R) terminates latch operations of the MAC operations, the right latch circuit 144(R) may be reset in response to a second clear signal CLR2 with a logic "high" level.

Figure 8:
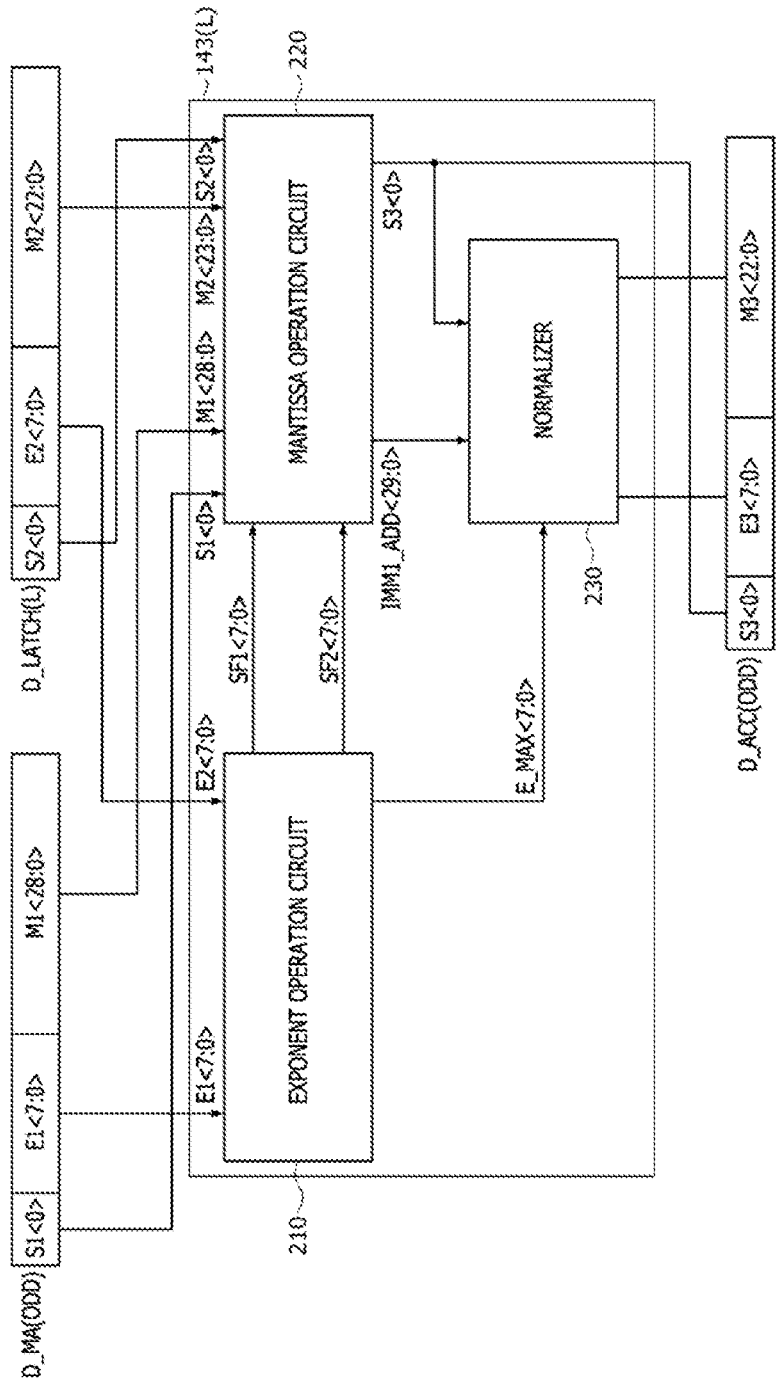
FIG. 8 is a block diagram illustrating an example of a configuration of a left accumulative adder included in a left accumulator shown in FIG. 7.

FIG. 8 is a block diagram illustrating an example of a configuration of the left accumulative adder 143(L) included in the left accumulator 140(L) shown in FIG. 7. The following descriptions on the left accumulative adder 143(L) may be equally applied to the right accumulative adder 143(R). In the present embodiment, it may be assumed that each of the first to 512$^{th}$ weight data W1~W512 and each of the first to 512$^{th}$ vector data V1~V512 have a 32-bit single-precision floating-point format, as described with reference to FIG. 3. Thus, each of the first to 512$^{th}$ weight data W1~W512 and each of the first to 512$^{th}$ vector data V1~V512 may be comprised of a sign datum with one bit, first exponent data with 8 bits, and mantissa data with 23 bits. The number of bits that are included in the mantissa data may increase during the adding calculation of the integrated adder tree 132 included in the multiplication circuit/adder tree 130. In the present embodiment, it may be assumed that the number of bits that are included in the mantissa data increases by six bits due to generation of carry bits during the adding calculation of the integrated adder tree 132 included in the multiplication circuit/adder tree 130. Accordingly, the odd-numbered multiplication/addition result data D_MA(ODD) may be comprised of a first sign datum S1<0> with one bit, first exponent data E1<7:0> with 8 bits, and first mantissa data M1<28:0> with 29 bits. Because the left latched data D_LATCH(L) are normalized during a previous additive adding calculation, the left latched data D_LATCH(L) may be comprised of a second sign datum S2<0> with one bit, second exponent data E2<7:0> with 8 bits, and second mantissa data M2<22:0> with 23 bits. An implied bit datum may be included in the second mantissa data M2<22:0> with 23 bits of the left latched data D_LATCH(L) before the second mantissa data M2<22:0> are input to the left accumulative adder 143(L). Thus, second mantissa data M2<23:0> with 24 bits may be input to the left accumulative adder 143(L).

Referring to FIG. 8, the left accumulative adder 143(L) may include an exponent operation circuit 210, a mantissa operation circuit 220, and a normalizer 230. The exponent operation circuit 210 may receive the first exponent data E1<7:0> of the odd-numbered multiplication/addition result data D_MA(ODD) from the first left register 141(L) and may also receive the second exponent data E2<7:0> of the left latched data D_LATCH(L) from the second left register 142(L). The exponent operation circuit 210 may perform an exponent operation on the first exponent data E1<7:0> and the second exponent data E2<7:0>. The exponent operation circuit 210 may generate and output maximum exponent data E_MAX<7:0>, first shift data SF1<7:0>, and second shift data SF2<7:0> as a result of the exponent operation. The maximum exponent data E_MAX<7:0> may correspond to either the first shift data SF1<7:0> or the second shift data SF2<7:0>, whichever has the largest value. The first shift data SF1<7:0> may have a first shift value that corresponds to the number of bits that the first mantissa data M1<28:0> of the odd-numbered multiplication/addition result data D_MA(ODD) has to be shifted. The second shift data SF2<7:0> may have a second shift value that corresponds to the number of bits that the second mantissa data M2<23:0> of the left latched data D_LATCH(L) has to be shifted. The first shift data SF1<7:0> and the second shift data SF2<7:0> that are output from the exponent operation circuit 210 may be transmitted to the mantissa operation circuit 220. The maximum exponent data E_MAX<7:0> that is output from the exponent operation circuit 210 may be transmitted to the normalizer 230.

The mantissa operation circuit 220 may receive the first sign datum S1<0> and the first mantissa data M1<28:0> of the odd-numbered multiplication/addition result data D_MA(ODD) from the first left register 141(L). The mantissa operation circuit 220 may also receive the second sign datum S2<0> and the second mantissa data M2<23:0> of the left latched data D_LATCH(L) from the second left register 142(L). In addition, the mantissa operation circuit 220 may receive the first shift data SF1<7:0> and the second shift data SF2<7:0> from the exponent operation circuit 210. The mantissa operation circuit 220 may perform a mantissa operation on the first mantissa data M1<28:0> and the second mantissa data M2<23:0> to generate a third sign datum S3<0> of the odd-numbered accumulated data D_ACC(ODD) and a first interim mantissa addition data IMM1_ADD<29:0>. The third sign datum S3<0> of the odd-numbered accumulated data D_ACC(ODD) and the first interim mantissa addition data IMM1_ADD<29:0> may be transmitted to the normalizer 230.

The normalizer 230 may receive the third sign datum S3<0> and the first interim mantissa addition data IMM1_ADD<29:0> from the mantissa operation circuit 220. In addition, the normalizer 230 may receive the maximum exponent data E_MAX<7:0> from the exponent operation circuit 210. The normalizer 230 may perform a normalization operation by using the maximum exponent data E_MAX<7:0>, the first interim mantissa addition data IMM1_ADD<29:0>, and the third sign datum S3<0> as input data, thereby generating and outputting third exponent data E3<7:0> with 8 bits and third mantissa data M3<22:0> with 23 bits of the odd-numbered accumulated data D_ACC(ODD). The third sign datum S3<0> that is output from the mantissa operation circuit 220 and the third exponent data E3<7:0> and the third mantissa data M3<22:0> that are output from the normalizer 230 may be transmitted to the input terminal D of the left latch circuit 144(L), as described with reference to FIG. 7.

Figure 9:
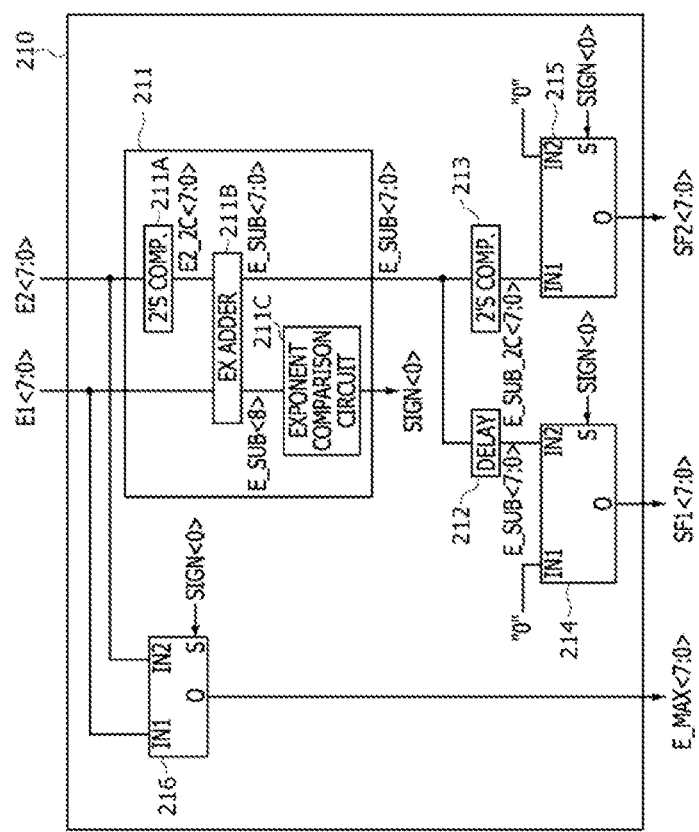
FIG. 9 is a block diagram illustrating an example of a configuration of an exponent operation circuit included in the left accumulative adder of FIG. 8.

FIG. 9 is a block diagram illustrating an example of a configuration of the exponent operation circuit 210 included in the left accumulative adder 143(L) of FIG. 8. Referring to FIG. 9, the exponent operation circuit 210 may include an exponent subtraction circuit 211, a delay circuit 212, a 2's complement circuit 213, a first selector 214, a second selector 215, and a third selector 216. In an embodiment, each of the first to third selectors 214, 215, and 216 may include a 2-to-1 multiplexer. The exponent subtraction circuit 211 may include a 2's complement processor 211A, an exponent adder 211B, and an exponent comparison circuit 211C. In the present embodiment, the exponent adder 211B may include an adder that adds integers.

The exponent subtraction circuit 211 may receive the first exponent data E1<7:0> of the odd-numbered multiplication/addition result data D_MA(ODD) and the second exponent data E2<7:0> of the left latched data D_LATCH(L). The exponent subtraction circuit 211 may generate 2's complement data of the second exponent data E2<7:0> in order to perform an arithmetic operation (E1<7:0>-E2<7:0>) that subtracts the second exponent data E2<7:0> from the first exponent data E1<7:0>. Thereafter, the exponent subtraction circuit 211 may add the 2's complement data of the second exponent data E2<7:0> to the first exponent data E1<7:0>. More specifically, the first exponent data E1<7:0> may be transmitted to a first input terminal of the exponent adder 211B, and the second exponent data E2<7:0> may be transmitted to the 2's complement processor 211A. The 2's complement processor 211A may calculate a 2's complement value of the second exponent data E2<7:0> to generate and output 2's complement data E2_2C<7:0> of the second exponent data E2<7:0>. The 2's complement data E2_2C<7:0> of the second exponent data E2<7:0> may be transmitted to a second input terminal of the exponent adder 211B.

The exponent adder 211B may add the 2's complement data E2_2C<7:0> of the second exponent data E2<7:0> to the first exponent data E1<7:0> to generate exponent subtraction data E_SUB<8:0> with 9 bits. The exponent adder 211B may separate the exponent subtraction data E_SUB<8:0> into two parts of a most significant bit (MSB) datum E_SUB<8> and 8-bit low-order data E_SUB<7:0>, obtained by removing the MSB datum E_SUB<8> from the exponent subtraction data E_SUB<8:0>. The exponent adder 211B may transmit the MSB datum E_SUB<8> to the exponent comparison circuit 211C and may transmit the 8-bit low-order data E_SUB<7:0> to the delay circuit 212 and the 2's complement circuit 213.

The exponent comparison circuit 211C may compare a value of the first exponent data E1<7:0> with a value of the second exponent data E2<7:0> by using the MSB datum E_SUB<8> that is output from the exponent adder 211B and may generate and output a sign signal SIGN<0> as the comparison result. Specifically, when a value of the first exponent data E1<7:0> is greater than a value of the second exponent data E2<7:0>, roundup may occur during the adding calculation of the exponent adder 211B. In such a case, the MSB datum E_SUB<8> may have a binary number of "1". When the MSB datum E_SUB<8> has a binary number of "1", the exponent comparison circuit 211C may output the sign signal SIGN<0> with a logic "low" level (e.g., a binary number of "0"), which denotes that the 8-bit low-order data E_SUB<7:0> is a positive number. In such a case, the second mantissa data M2<23:0> may be shifted by the number of bits that correspond to a difference value between absolute values of the first exponent data E1<7:0> and the second exponent data E2<7:0> such that the first exponent data E1<7:0> and the second exponent data E2<7:0> have the same absolute value. In contrast, when a value of the first exponent data E1<7:0> is less than a value of the second exponent data E2<7:0>, no roundup occurs during the adding calculation of the exponent adder 211B. In such a case, the MSB datum E_SUB<8> may have a binary number of "0". When the MSB datum E_SUB<8> has a binary number of "0", the exponent comparison circuit 211C may output the sign signal SIGN<0> with a logic "high" level (e.g., a binary number of "1"), which denotes that the 8-bit low-order data E_SUB<7:0> is a negative number. In such a case, the first mantissa data M1<28:0> may be shifted by the number of bits that correspond to a difference value between absolute values of the first exponent data E1<7:0> and the second exponent data E2<7:0> such that the first exponent data E1<7:0> and the second exponent data E2<7:0> have the same absolute value. The sign signal SIGN<0> that is output from the exponent comparison circuit 211C may be transmitted to selection terminals S of the first to third selectors 214, 215, and 216.

The delay circuit 212 may delay the 8-bit low-order data E_SUB<7:0>, which is output from the exponent adder 211B of the exponent subtraction circuit 211 by a certain delay time and may output the delayed data of the 8-bit low-order data E_SUB<7:0>. In an embodiment, the certain delay time may correspond to the time it takes the 2's complement circuit 213 to perform an arithmetic operation that calculates the 2's complement data of the 8-bit low-order data E_SUB<7:0>. The 8-bit low-order data E_SUB<7:0> that is output from the delay circuit 212 may be transmitted to a second input terminal IN2 of the first selector 214. The 2's complement circuit 213 may calculate a 2's complement value of the 8-bit low-order data E_SUB<7:0> that is output from the exponent adder 211B, thereby generating and outputting 2's complement data E_SUB_2C<7:0>. The 2's complement data E_SUB_2C<7:0> of the 8-bit low-order data E_SUB<7:0> may have an absolute value of a difference value between the first exponent data E1<7:0> and the second exponent data E2<7:0>. The 2's complement circuit 213 may transmit the 2's complement data E_SUB_2C<7:0> of the 8-bit low-order data E_SUB<7:0> to a first input terminal IN1 of the second selector 215.

The first selector 214 may receive a datum of "0" through a first input terminal IN1 of the first selector 214. In addition, the first selector 214 may receive the 8-bit low-order data E_SUB<7:0> from the delay circuit 212 through the second input terminal IN2 of the first selector 214. The second selector 215 may receive the 2's complement data E_SUB_2C<7:0> from the 2's complement circuit 213 through the first input terminal IN1 of the second selector 215. In addition, the second selector 215 may receive a datum of "0" through a second input terminal IN2 of the second selector 215. Each of the first and second selectors 214 and 215 may output one of two sets of input data according to the sign signal SIGN<0> that is input to the selection terminal S thereof. Hereinafter, data, which is output from the first selector 214 through an output terminal O of the first selector 214, will be referred to as the first shift data SF1<7:0>. In addition, data, which is output from the second selector 215 through an output terminal O of the second selector 215, will be referred to as the second shift data SF2<7:0>.

When the sign signal SIGN<0> has a datum of "0" (i.e., when the second mantissa data M2<23:0> has to be shifted), each of the first selector 214 and the second selector 215 may selectively output the data that is input through the first input terminal IN1. That is, the first selector 214 may selectively output the datum of "0" as the first shift data SF1<7:0> through the output terminal O of the first selector 214, and the second selector 215 may selectively output the 2's complement data E_SUB_2C<7:0> as the second shift data SF2<7:0> through the output terminal O of the second selector 215. When the sign signal SIGN<0> has a datum of "1" (i.e., when the first mantissa data M1<28:0> has to be shifted), each of the first selector 214 and the second selector 215 may selectively output the data that is input through the second input terminal IN2. That is, the first selector 214 may selectively output the 8-bit low-order data E_SUB<7:0> as the first shift data SF1<7:0> through the output terminal O of the first selector 214, and the second selector 215 may selectively output the datum of "0" as the second shift data SF2<7:0> through the output terminal O of the second selector 215. The first shift data SF1<7:0> and the second shift data SF2<7:0> that are output from the first and second selectors 214 and 215, respectively, may be transmitted to the mantissa operation circuit 220.

The third selector 216 may receive the first exponent data E1<7:0> of the odd-numbered multiplication/addition result data D_MA(ODD) through a first input terminal IN1 of the third selector 216 and may also receive the second exponent data E2<7:0> of the left latched data D_LATCH(L) through a second input terminal IN2 of the third selector 216. The third selector 216 may selectively output either the first exponent data E1<7:0> or the second exponent data E2<7:0>, whichever has the largest value, through an output terminal O of the third selector 216 according to the sign signal SIGN<0> that is input through a selection terminal S of the third selector 216. Hereinafter, data, which is output from the third selector 216 through the output terminal O of the third selector 216, will be referred to as the maximum exponent data E_MAX<7:0>. When the sign signal SIGN<0> has a datum of "0", which denotes a positive number, it may correspond to a case in which a value of the first exponent data E1<7:0> is greater than a value of the second exponent data E2<7:0>. In such a case, the third selector 216 may output the first exponent data E1<7:0> as the maximum exponent data E_MAX<7:0>. In contrast, when the sign signal SIGN<0> has a datum of "1", which denotes a negative number, it may correspond to a case in which a value of the second exponent data E2<7:0> is greater than a value of the first exponent data E1<7:0>. In such a case, the third selector 216 may output the second exponent data E2<7:0> as the maximum exponent data E_MAX<7:0>. The third selector 216 may transmit the maximum exponent data E_MAX<7:0> to the normalizer 230.

Figure 10:
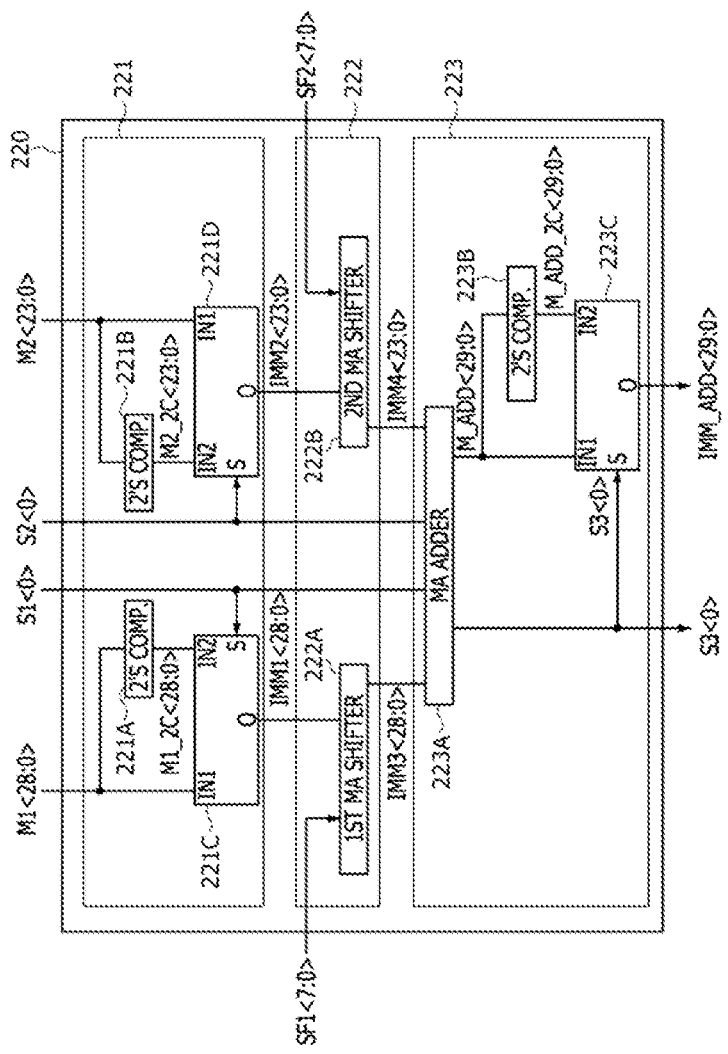
FIG. 10 is a block diagram illustrating an example of a configuration of a mantissa operation circuit included in the left accumulative adder of FIG. 8.

FIG. 10 is a block diagram illustrating an example of a configuration of the mantissa operation circuit 220 included in the left accumulative adder 143(L) of FIG. 8. Referring to FIG. 10, the mantissa operation circuit 220 may include a negative number processing circuit 221, a mantissa shift circuit 222, and a mantissa addition circuit 223. The negative number processing circuit 221 may include a first 2's complement circuit 221A, a second 2's complement circuit 221B, a first selector 221C, and a second selector 221D. The mantissa shift circuit 222 may include a first mantissa shifter 222A and a second mantissa shifter 222B. The mantissa addition circuit 223 may include a mantissa adder 223A, a third 2's complement circuit 223B, and a third selector 223C.

The first 2's complement circuit 221A of the negative number processing circuit 221 may receive the first mantissa data M1<28:0> of the odd-numbered multiplication/addition result data D_MA(ODD). The first 2's complement circuit 221A may calculate a 2's complement value of the first mantissa data M1<28:0> to generate and output 2's complement data M1_2C<28:0> of the first mantissa data M1<28:0>. The first selector 221C may receive the first mantissa data M1<28:0> of the odd-numbered multiplication/addition result data D_MA(ODD) through a first input terminal IN1 of the first selector 221C. The first selector 221C may also receive the 2's complement data M1_2C<28:0> from the first 2's complement circuit 221A through a second input terminal IN2 of the first selector 221C. In addition, the first selector 221C may receive the first sign datum S1<0> of the odd-numbered multiplication/addition result data D_MA(ODD) through a selection terminal S of the first selector 221C. When the first sign datum S1<0> has a binary number of "0", denoting a positive number, the first selector 221C may output the first mantissa data M1<28:0> that is input through the first input terminal IN1 through the output terminal O of the first selector 221C. In contrast, when the first sign datum S1<0> has a binary number of "1", denoting a negative number, the first selector 221C may output the 2's complement data M1_2C<28:0> that is input through the second input terminal IN2 through the output terminal O of the first selector 221C. Hereinafter, the output data of the first selector 221C will be referred to as first interim mantissa data IMM1<28:0>.

The second 2's complement circuit 221B of the negative number processing circuit 221 may receive the second mantissa data M2<23:0> of the left latched data D_LATCH (L). The second 2's complement circuit 221B may calculate a 2's complement value of the second mantissa data M2<23:0> to generate and output 2's complement data M2_2C<23:0> of the second mantissa data M2<23:0>. The second selector 221D may receive the second mantissa data M2<23:0> of the left latched data D_LATCH(L) through a first input terminal IN1 of the second selector 221D. The second selector 221D may also receive the 2's complement data M2_2C<23:0> from the second 2's complement circuit 221B through a second input terminal IN2 of the second selector 221D. In addition, the second selector 221D may receive the second sign datum S2<0> of the left latched data D_LATCH(L) through a selection terminal S of the second selector 221D. When the second sign datum S2<0> has a binary number of "0", denoting a positive number, the second selector 221D may output the second mantissa data M2<23:0> that is input through the first input terminal IN1 through the output terminal O of the second selector 221D. In contrast, when the second sign datum S2<0> has a binary number of "1", denoting a negative number, the second selector 221D may output the 2's complement data M2_2C<23:0> that is input through the second input terminal IN2 through the output terminal O of the second selector 221D. Hereinafter, the output data of the second selector 221D will be referred to as second interim mantissa data IMM2<23:0>.

The first mantissa shifter 222A of the mantissa shift circuit 222 may receive the first interim mantissa data IMM1<28:0> from the first selector 221C of the negative number processing circuit 221. In addition, the first mantissa shifter 222A may receive the first shift data SF1<7:0> from the first selector 214 of the exponent operation circuit 210. The first mantissa shifter 222A may shift the first interim mantissa data IMM1<28:0> by the number of bits that correspond to an absolute value of the first shift data SF1<7:0> to output the shifted data of the first interim mantissa data IMM1<28:0>. Hereinafter, the output data of the first mantissa shifter 222A will be referred to as third interim mantissa data IMM3<28:0>. When the first shift data SF1<7:0> have a value of "0", the third interim mantissa data IMM3<28:0> may be equal to the first interim mantissa data IMM1<28:0>. In contrast, when the first shift data SF1<7:0> are the 8-bit low-order data E_SUB<7:0> of the exponent subtraction data E_SUB<8:0>, the third interim mantissa data IMM3<28:0> may be generated by shifting the first interim mantissa data IMM1<28:0> by the number of bits that correspond to an absolute value of the 8-bit low-order data E_SUB<7:0> of the exponent subtraction data E_SUB<8:0>. The third interim mantissa data IMM3<28:0> that is output from the first mantissa shifter 222A may be transmitted to the mantissa addition circuit 223.

The second mantissa shifter 222B of the mantissa shift circuit 222 may receive the second interim mantissa data IMM2<23:0> from the second selector 221D of the negative number processing circuit 221. In addition, the second mantissa shifter 222B may receive the second shift data SF2<7:0> from the second selector 215 of the exponent operation circuit 210. The second mantissa shifter 222B may shift the second interim mantissa data IMM2<23:0> by the number of bits that correspond to an absolute value of the second shift data SF2<7:0> to output the shifted data of the second interim mantissa data IMM2<23:0>. Hereinafter, the output data of the second mantissa shifter 222B will be referred to as fourth interim mantissa data IMM4<23:0>. When the second shift data SF2<7:0> have a value of "0", the fourth interim mantissa data IMM4<23:0> may be equal to the second interim mantissa data IMM2<23:0>. In contrast, when the second shift data SF2<7:0> are the 2's complement data E_SUB_2C<7:0> of the 8-bit low-order data E_SUB<7:0>, the fourth interim mantissa data IMM4<23:0> may be generated by shifting the second interim mantissa data IMM2<23:0> by the number of bits that correspond to an absolute value of the 2's complement data E_SUB_2C<7:0> of the 8-bit low-order data E_SUB<7:0>. The fourth interim mantissa data IMM4<23:0> that is output from the second mantissa shifter 222B may be transmitted to the mantissa addition circuit 223.

The mantissa adder 223A of the mantissa addition circuit 223 may receive the third interim mantissa data IMM3<28:0> from the first mantissa shifter 222A of the mantissa shift circuit 222 and may also receive the fourth interim mantissa data IMM4<23:0> from the second mantissa shifter 222B of the mantissa shift circuit 222. In addition, the mantissa adder 223A may receive the first sign datum S1<0> and the second sign datum S2<0>. The mantissa adder 223A may generate and output a third sign datum S3<0>. In addition, the mantissa adder 223A may add the third interim mantissa data IMM3<28:0> to the fourth interim mantissa data IMM4<23:0> to generate and output mantissa addition data M_ADD<29:0>. When both of the first sign datum S1<0> and the second sign datum S2<0> have a binary number of "0", denoting a positive number, the mantissa adder 223A may output a binary number of "0" as the third sign datum S3<0>. When both of the first sign datum S1<0> and the second sign datum S2<0> have a binary number of "1", denoting a negative number, the mantissa adder 223A may output a binary number of "1" as the third sign datum S3<0>. When one of the first and second sign data S1<0> and S2<0> has a binary number of "0" and the other has a binary number of "1", the mantissa adder 223A may output a binary number of "0" as the third sign datum S3<0> if roundup occurs during the adding calculation on the third and fourth interim mantissa data IMM3<28:0> and IMM4<23:0> and may output a binary number of "1" as the third sign datum S3<0> if no roundup occurs during the adding calculation on the third and fourth interim mantissa data IMM3<28:0> and IMM4<23:0>. The third sign datum S3<0> that is output from the mantissa adder 223A may correspond to a sign datum of the odd-numbered accumulated data D_ACC(ODD). The third sign datum S3<0> that is output from the mantissa adder 223A may also be transmitted to a selection terminal S of the third selector 223C. The mantissa addition data M_ADD<29:0> that is output from the mantissa adder 223A may be transmitted to the third 2's complement circuit 223B and the third selector 223C.

The third 2's complement circuit 223B of the mantissa addition circuit 223 may receive the mantissa addition data M_ADD<29:0> from the mantissa adder 223A. The third 2's complement circuit 223B may calculate a 2's complement value of the mantissa addition data M_ADD<29:0> to generate and output 2's complement data M_ADD_2C<29:0> of the mantissa addition data M_ADD<29:0>. The third selector 223C may receive the mantissa addition data M_ADD<29:0> from the mantissa adder 223A through a first input terminal IN1 of the third selector 223C and may also receive the 2's complement data M_ADD_2C<29:0> from the third 2's complement circuit 223B through a second input terminal IN2 of the third selector 223C. In addition, the third selector 223C may receive the third sign datum S3<0> from the mantissa adder 223A through a selection terminal S of the third selector 223C. When the third sign datum S3<0> has a binary number of "0", denoting a positive number, the third selector 223C may output the mantissa addition data M_ADD<29:0> through an output terminal O of the third selector 223C. In contrast, when the third sign datum S3<0> has a binary number of "1", denoting a negative number, the third selector 223C may output the 2's complement data M_ADD_2C<29:0> through the output terminal O of the third selector 223C. Hereinafter, the output data of the third selector 223C will be referred to as interim mantissa addition data IMM_ADD<29:0>.

Figure 11:
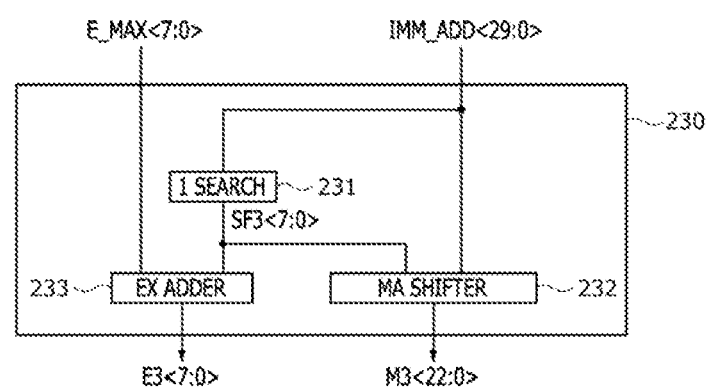
FIG. 11 is a block diagram illustrating an example of a configuration of a normalizer included in the left accumulative adder of FIG. 8.

FIG. 11 is a block diagram illustrating an example of a configuration of the normalizer 230 included in the left accumulative adder 143(L) of FIG. 8. Referring to FIG. 11, the normalizer 230 may include a "1" search circuit 231, a mantissa shifter 232, and an exponent adder 233. The "1" search circuit 231 of the normalizer 230 may receive the interim mantissa addition data IMM_ADD<29:0> from the third selector (223C of FIG. 10) of the mantissa addition circuit (223 of FIG. 10). The "1" search circuit 231 may search a position in which a binary number of "1" is first located in a right direction from a leftmost bit of the interim mantissa addition data IMM_ADD<29:0> and may generate third shift data SF3<7:0> as the search result. The third shift data SF3<7:0> may have a value that corresponds to the number of bits for shifting the interim mantissa addition data IMM_ADD<29:0> such that the interim mantissa addition data IMM_ADD<29:0> have a standard form of "1.mantissa". In an embodiment, the number of bits that are included in the third shift data may be arbitrarily set. In the present embodiment, it may be assumed that the third shift data SF3<7:0> are set to have 8 bits. The third shift data SF3<7:0> that is output from the "1" search circuit 231 may be transmitted to the mantissa shifter 232 and the exponent adder 233.

The mantissa shifter 232 of the normalizer 230 may perform a shifting operation on the interim mantissa addition data IMM_ADD<29:0> such that the interim mantissa addition data IMM_ADD<29:0> have a standard form of "1.mantissa". The mantissa shifter 232 may receive the third shift data SF3<7:0> from the "1" search circuit 231 and may also receive the interim mantissa addition data IMM_ADD<29:0> from the third selector (223C of FIG. 10) of the mantissa addition circuit (223 of FIG. 10). The mantissa shifter 232 may shift the interim mantissa addition data IMM_ADD<29:0> by the number of bits that correspond to a value of the third shift data SF3<7:0>, thereby generating the third mantissa data M3<22:0> of the odd-numbered accumulated data D_ACC(ODD) that is output from the left accumulative adder 143(L). Although not illustrated in FIG. 11, a rounding process may be performed during the shifting operation of the mantissa shifter 232.

The exponent adder 233 of the normalizer 230 may change a value of the maximum exponent data E_MAX<7:0> to compensate for the variation of the interim mantissa addition data IMM_ADD<29:0> that is due to the shifting operation for shifting the interim mantissa addition data IMM_ADD<29:0> by the number of bits that correspond to a value of the third shift data SF3<7:0>. The exponent adder 233 may receive the maximum exponent data E_MAX<7:0> from the third selector (216 of FIG. 9) of the exponent operation circuit (210 of FIG. 9) and may also receive the third shift data SF3<7:0> from the "1" search circuit 231. The exponent adder 233 may perform an adding calculation on the maximum exponent data E_MAX<7:0> and the third shift data SF3<7:0> to generate the third exponent data E3<7:0> of the odd-numbered accumulated data D_ACC(ODD) that is output from the left accumulative adder 143(L).

Figure 12:
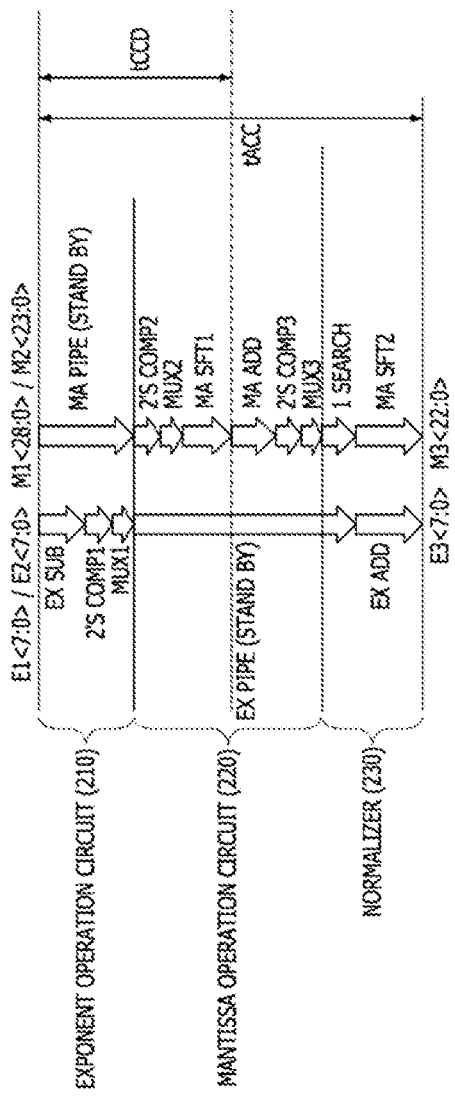
FIG. 12 illustrates an operation of processing exponent part data and mantissa part data during an accumulative adding calculation of the left accumulative adder described with reference to FIGS. 8 to 11.

FIG. 12 illustrates an operation of processing the exponent data and the mantissa data during an accumulative adding calculation of the left accumulative adder 143(L), described with reference to FIGS. 8 to 11. Referring to FIGS. 8 to 11 and 12, the exponent operation circuit 210 may sequentially perform an exponent subtraction operation EX_SUB on the first exponent data E1<7:0> and the second exponent data E2<7:0>, a first 2's complement calculation operation 2'S_COMP1, and a first selection operation MUX1. As described with reference to FIG. 9, the exponent subtraction operation EX_SUB may correspond to an operation that is performed by the exponent subtraction circuit 211 to generate the sign signal SIGN<0> and the 8-bit low-order data E_SUB<7:0> of the exponent subtraction data E_SUB<8:0>. The first 2's complement calculation operation 2'S_COMP1 may correspond to an operation that is performed by the 2's complement circuit 213 calculating a 2's complement value of the 8-bit low-order data E_SUB<7:0> to generate the 2's complement data E_SUB_2C<7:0>. The first selection operation MUX1 may correspond to an operation that is performed by the first and second selectors 214 and 215 to generate the first shift data SF1<7:0> and the second shift data SF2<7:0>. While the operations of the exponent operation circuit 210 are performed, the first mantissa data M1<28:0> and the second mantissa data M2<23:0> may be on standby in a mantissa pipe MA_PIPE.

After all of the operations of the exponent operation circuit 210 terminate, the mantissa operation circuit 220 may sequentially perform a second 2's complement calculation operation 2'S_COMP2 on the first mantissa data M1<28:0> and the second mantissa data M2<23:0>, a second selection operation MUX2, a first mantissa shift operation MA_SFT1, a mantissa addition operation MA_ADD, a third 2's complement calculation operation 2'S_COMP3, and a third selection operation MUX3. As described with reference to FIG. 10, the second 2's complement calculation operation 2'S_COMP2 may correspond to an operation that is performed by the first and second 2's complement circuits 221A and 221B of the negative number processing circuit 221 to generate the 2's complement data M1_2C<28:0> of the first mantissa data M1<28:0> and the 2's complement data M2_2C<23:0> of the second mantissa data M2<23:0>. The second selection operation MUX2 may correspond to an operation that is performed by the first and second selectors 221C and 221D of the negative number processing circuit 221 to generate the first interim mantissa data IMM1<28:0> and the second interim mantissa data IMM2<23:0>. The first mantissa shift operation MA_SFT1 may correspond to an operation that is performed by the first and second mantissa shifters 222A and 222B of the mantissa shift circuit 222 to generate the third interim mantissa data IMM3<28:0> and the fourth interim mantissa data IMM4<23:0>. The mantissa addition operation MA_ADD may correspond to an operation that is performed by the mantissa adder 223A of the mantissa addition circuit 223 to generate the third sign datum S3<0> and the mantissa addition data M_ADD<29:0>. The third 2's complement calculation operation 2'S_COMP3 may correspond to an operation that is performed by the third 2's complement circuit 223B of the mantissa addition circuit 223 to generate the 2's complement data M_ADD_2C<29:0> of the mantissa addition data M_ADD<29:0>. The third selection operation MUX3 may correspond to an operation that is performed by the third selector 223C of the mantissa addition circuit 223 to generate the interim mantissa addition data IMM_ADD<29:0>. While the operations of the mantissa operation circuit 220 are performed, no exponent processing operation is performed and the maximum exponent data E_MAX<7:0> that is generated by the exponent operation circuit (210 of FIG. 8) may be on standby in an exponent pipe EX_PIPE.

After all of the operations of the mantissa operation circuit 220 terminate, the normalizer 230 may sequentially perform a "1" searching operation 1_SEARCH, an exponent addition operation EX_ADD, and a second mantissa shift operation MA_SFT2. As described with reference to FIG. 11, the "1" searching operation 1_SEARCH may correspond to an operation that is performed by the "1" search circuit 231 of the normalizer 230 to generate the third shift data SF3<7:0>. The exponent addition operation EX_ADD may correspond to an operation that is performed by the exponent adder 233 of the normalizer 230 to generate the third exponent data E3<7:0> of the odd-numbered accumulated data D_ACC(ODD). The second mantissa shift operation MA_SFT2 may correspond to an operation that is performed by the mantissa shifter 232 of the normalizer 230 to generate the third mantissa data M3<22:0> of the odd-numbered accumulated data D_ACC(ODD). The exponent addition operation EX_ADD and the second mantissa shift operation MA_SFT2 may be performed independently. Meanwhile, the maximum exponent data E_MAX<7:0> that is generated by the exponent operation circuit (210 of FIG. 8) may be on standby in the exponent pipe EX_PIPE until the "1" searching operation 1_SEARCH terminates.

As described above, while the exponent data are processed by the exponent operation circuit 210, the mantissa data may be on standby. In contrast, while the mantissa data are processed by the mantissa operation circuit 220, the exponent data may be on standby. The exponent data may be on standby until the normalizer 230 terminates the "1" searching operation 1_SEARCH. The exponent addition operation EX_ADD and the second mantissa shift operation MA_SFT2 may be performed independently. A time (i.e., an accumulative addition time "tACC") it takes the left accumulative adder (143(L) of FIG. 7) of the left accumulator (140(L) of FIG. 7) to generate and output the odd-numbered accumulated data D_ACC(ODD) by using the odd-numbered multiplication/addition result data D_MA(ODD) and the left latched data D_LATCH(L) as input data may correspond to the time it takes to perform all of the operations of the exponent operation circuit 210, the mantissa operation circuit 220, and the normalizer 230. That is, after the accumulative addition time "tACC" elapses from a point in time at which the odd-numbered multiplication/addition result data D_MA(ODD) and the left latched data D_LATCH(L) are input to the left accumulative adder 143(L), the odd-numbered accumulated data D_ACC(ODD) may be output from the left accumulative adder 143(L). The odd-numbered accumulated data D_ACC(ODD) may be used as the left latched data D_LATCH(L) that are accumulatively added to the odd-numbered multiplication/addition result data D_MA(ODD) that is input to the left accumulative adder 143(L) in a next step. This means that the left latched data D_LATCH(L) are able to be input to the left accumulative adder 143(L) at an interval time of the accumulative addition time "tACC". In contrast, the odd-numbered multiplication/addition result data D_MA(ODD) may be input to the left accumulative adder 143(L) at an interval time of the CAS to CAS delay time "tCCD". That is, in the event that the odd-numbered multiplication/addition result data D_MA(ODD) are input to the left accumulative adder 143(L) at an interval time of the CAS to CAS delay time "tCCD", the left latched data D_LATCH(L) cannot be input to the left accumulative adder 143(L) with the odd-numbered multiplication/addition result data D_MA(ODD) due to a previous accumulative adding calculation that has not terminated yet. Thus, the AI accelerator 100 according to the present embodiment may be configured such that each of the left accumulative adder 143(L) and the right accumulative adder 143(R) receives the multiplication/addition result data at an interval time of twice the CAS to CAS delay time "tCCD". In such a case, if the accumulative addition time "tACC" is not longer than twice the CAS to CAS delay time "tCCD", the multiplication/addition result data and the latched data may be input to each of the left accumulative adder 143(L) and the right accumulative adder 143(R) together.

Figure 13:
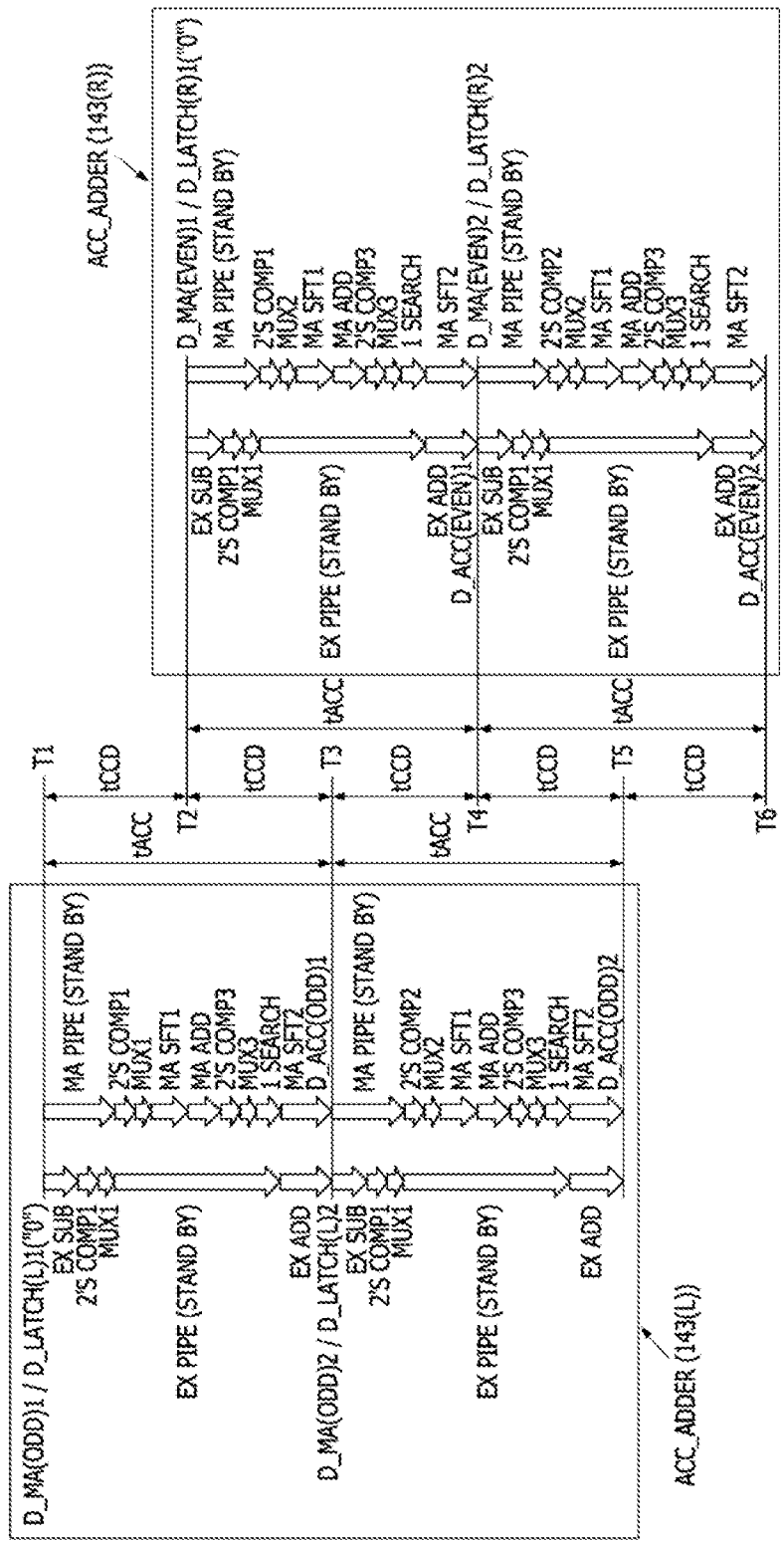
FIG. 13 illustrates operation timings of a left accumulative adder and a right accumulative adder shown in FIG. 7.

FIG. 13 illustrates operation timings of the left accumulative adder 143(L) and the right accumulative adder 143(R) shown in FIG. 7. In the present embodiment, it may be assumed that the accumulative addition time "tACC" is set to be twice the CAS to CAS delay time "tCCD" (i.e., "2×tCCD") that corresponds to a maximum value. Referring to FIGS. 7 and 13, the left accumulative adder 143(L) may receive first odd-numbered multiplication/addition result data D_MA(ODD)1 and first left latched data D_LATCH(L)1 at a first point in time "T1". The first odd-numbered multiplication/addition result data D_MA(ODD)1 may correspond to first multiplication/addition result data that is output from the multiplication circuit/adder tree (130 of FIG. 1). The first point in time "T1" may be a moment when a first pulse of the odd clock signal CK_ODD occurs, as described with reference to FIG. 2. The left latch circuit 144(L) may have a reset state at the first point in time "T1" because the present accumulative adding calculation is a first accumulative adding calculation of the left accumulator 140(L). Thus, the first left latched data D_LATCH(L)1 with a reset value of "0" may be input to the left accumulative adder 143(L). At the first point in time "T1", the left accumulative adder 143(L) may commence to perform an accumulative adding calculation on the first odd-numbered multiplication/addition result data D_MA(ODD)1 and the first left latched data D_LATCH(L)1. At a third point in time "T3" when the accumulative addition time "tACC" (i.e., "2×tCCD") elapses from the first point in time "T1", the left accumulative adder 143(L) may output first odd-numbered accumulated data D_ACC(ODD)1. The first odd-numbered accumulated data D_ACC(ODD)1 may be used as second left latched data D_LATCH(L)2 during a next accumulative adding calculation of the left accumulative adder 143(L).

At a second point in time "T2" when the CAS to CAS delay time "tCCD" elapses from the first point in time "T1", the right accumulative adder 143(R) may receive first even-numbered multiplication/addition result data D_MA(EVEN)1 and first right latched data D_LATCH(R)1. The first even-numbered multiplication/addition result data D_MA(EVEN)1 may correspond to second multiplication/addition result data that is output from the multiplication circuit/adder tree (130 of FIG. 1). The second point in time "T2" may be a moment when a first pulse of the even clock signal CK_EVEN occurs, as described with reference to FIG. 2. The right latch circuit 144(R) may have a reset state at the second point in time "T2" because the present accumulative adding calculation is a first accumulative adding calculation of the right accumulator 140(R). Thus, the first right latched data D_LATCH(R)1 with a reset value of "0" may be input to the right accumulative adder 143(R). At the second point in time "T2", the right accumulative adder 143(R) may commence to perform an accumulative adding calculation on the first even-numbered multiplication/addition result data D_MA(EVEN)1 and the first right latched data D_LATCH(R)1. At a fourth point in time "T4" when the accumulative addition time "tACC" (i.e., "2×tCCD") elapses from the second point in time "T2", the right accumulative adder 143(R) may output first even-numbered accumulated data D_ACC(EVEN)1. The first even-numbered accumulated data D_ACC(EVEN)1 may be used as second right latched data D_LATCH(R)2 during a next accumulative adding calculation of the right accumulative adder 143(R).

At the third point in time "T3" when the CAS to CAS delay time "tCCD" elapses from the second point in time "T2", the left accumulative adder 143(L) may receive second odd-numbered multiplication/addition result data D_MA(ODD)2 and the second left latched data D_LATCH(L)2. The second odd-numbered multiplication/addition result data D_MA(ODD)2 may correspond to third multiplication/addition result data that is output from the multiplication circuit/adder tree (130 of FIG. 1). The third point in time "T3" may be a moment when a second pulse of the odd clock signal CK_ODD occurs, as described with reference to FIG. 2. Because the first odd-numbered accumulated data D_ACC(ODD)1 are latched in the left latch circuit 144(L) by a previous step, the first odd-numbered accumulated data D_ACC(ODD)1 that corresponds to the second left latched data D_LATCH(L)2 may be input to the left accumulative adder 143(L). At the third point in time "T3", the left accumulative adder 143(L) may commence to perform an accumulative adding calculation on the second odd-numbered multiplication/addition result data D_MA(ODD)2 and the second left latched data D_LATCH(L)2. At a fifth point in time "T5" when the accumulative addition time "tACC" (i.e., "2×tCCD") elapses from the third point in time "T3", the left accumulative adder 143(L) may output second odd-numbered accumulated data D_ACC(ODD)2. The second odd-numbered accumulated data D_ACC(ODD)2 may be used as third left latched data (not shown) during a next accumulative adding calculation of the left accumulative adder 143(L).

At the fourth point in time "T4" when the CAS to CAS delay time "tCCD" elapses from the third point in time "T3", the right accumulative adder 143(R) may receive second even-numbered multiplication/addition result data D_MA(EVEN)2 and the second right latched data D_LATCH(R)2.

The second even-numbered multiplication/addition result data D_MA(EVEN)2 may correspond to fourth multiplication/addition result data that is output from the multiplication circuit/adder tree (130 of FIG. 1). The fourth point in time "T4" may be a moment when a second pulse of the even clock signal CK_EVEN occurs, as described with reference to FIG. 2. Because the first even-numbered accumulated data D_ACC(EVEN)1 are latched in the right latch circuit 144(R) by a previous step, the first even-numbered accumulated data D_ACC(EVEN)1 that corresponds to the second right latched data D_LATCH(R)2 may be input to the right accumulative adder 143(R). At the fourth point in time "T4", the right accumulative adder 143(R) may commence to perform an accumulative adding calculation on the second even-numbered multiplication/addition result data D_MA (EVEN)2 and the second right latched data D_LATCH(R)2. At a sixth point in time "T6" when the accumulative addition time "tACC" (i.e., "2×tCCD") elapses from the fourth point in time "T4", the right accumulative adder 143(R) may output second even-numbered accumulated data D_ACC (EVEN)2. The second even-numbered accumulated data D_ACC(EVEN)2 may be used as third right latched data (not shown) during a next accumulative adding calculation of the right accumulative adder 143(R).

Figure 14:
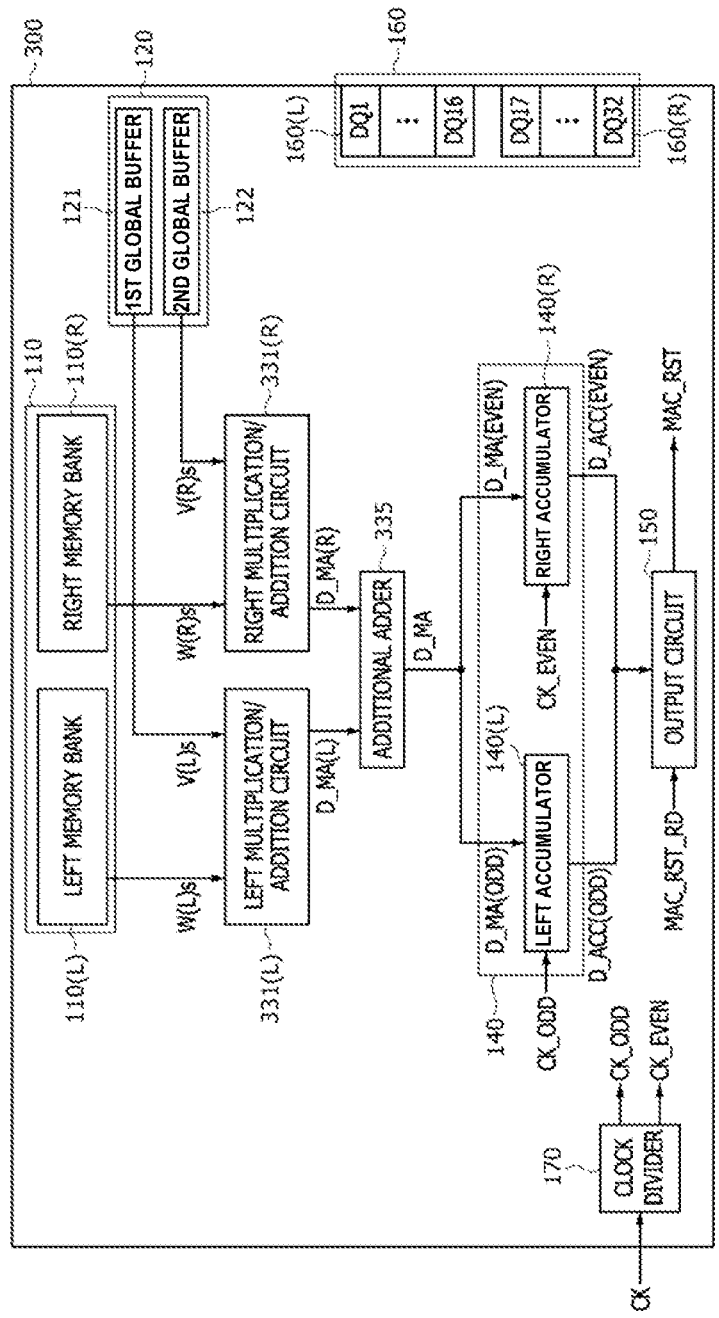
FIG. 14 is a block diagram illustrating an artificial intelligence accelerator according to another embodiment of the present disclosure.
Figure 15:
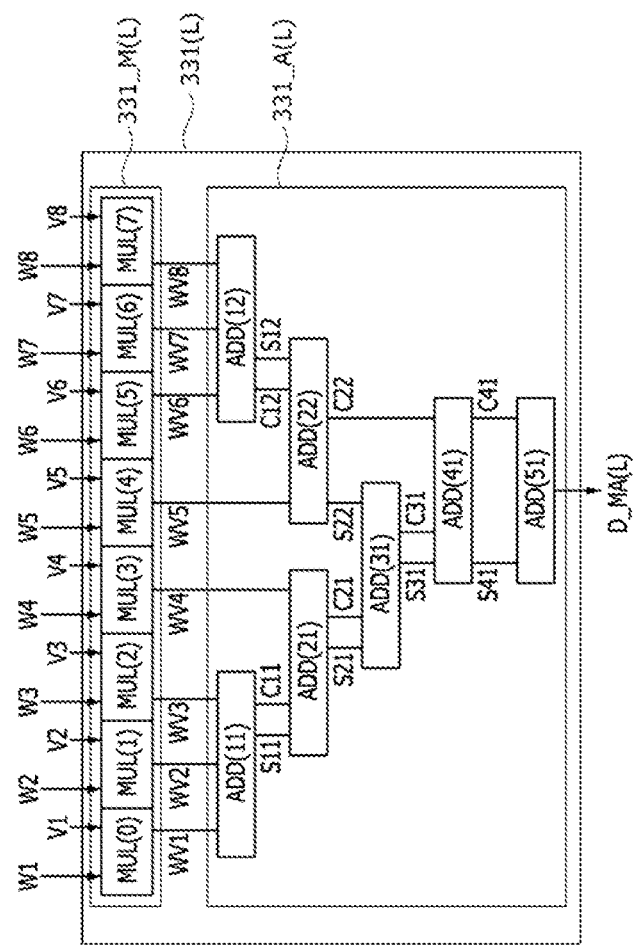
FIG. 15 is a block diagram illustrating an example of a configuration of a left multiplication/addition circuit included in the artificial intelligence accelerator of FIG. 14.
Figure 16:
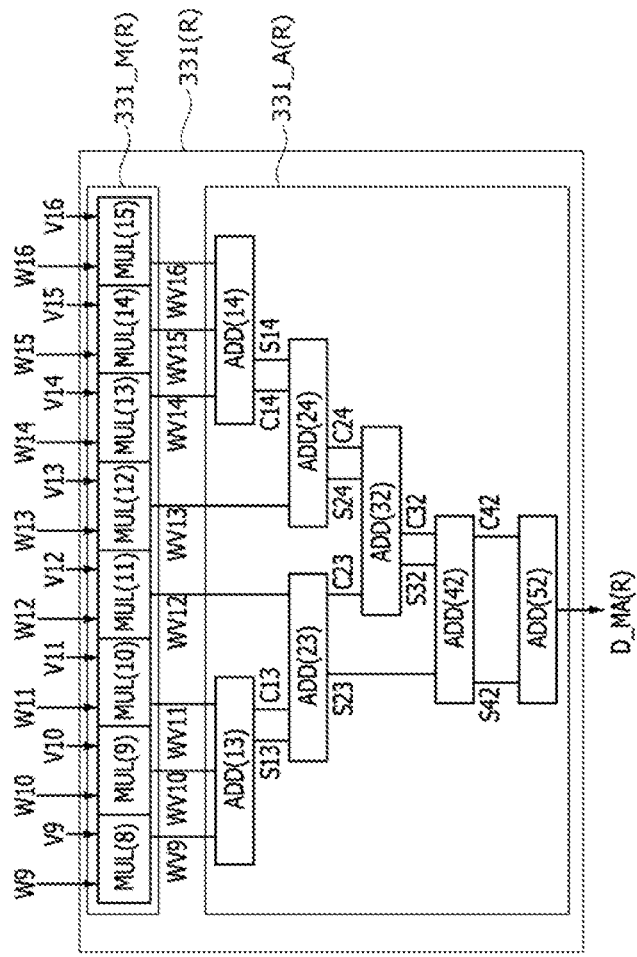
FIG. 16 is a block diagram illustrating an example of a configuration of a right multiplication/addition circuit included in the artificial intelligence accelerator of FIG. 14.

FIG. 14 is a block diagram illustrating an AI accelerator 300 according to another embodiment of the present disclosure. FIGS. 15 and 16 are block diagrams illustrating configurations of a left multiplication/addition circuit 331 (L) and a right multiplication/addition circuit 331(R) included in the AI accelerator 300 of FIG. 14, respectively. In FIG. 14, the same reference numerals or symbols as used in FIG. 1 may denote the same elements. Thus, descriptions of the same elements as set forth in the embodiment of FIG. 1 will be omitted in the present embodiment. First, referring to FIG. 14, the AI accelerator 300 may include the first memory circuit 110, the second memory circuit 120, the left multiplication/addition circuit 331(L), the right multiplication/addition circuit 331(R), an additional adder 335, the accumulative addition circuit 140, the output circuit 150, the data I/O circuit 160, and the clock divider 170. The AI accelerator 300 may be different from the AI accelerator 100 described with reference to FIG. 1 in terms of a point that the AI accelerator 300 includes the left multiplication/addition circuit 331(L), the right multiplication/addition circuit 331 (R), and the additional adder 335.

Specifically, the left multiplication/addition circuit 331(L) may include a left multiplication circuit 331_M(L) and a left adder tree 331_A(L), as illustrated in FIG. 15. The left multiplication circuit 331_M(L) may include a plurality of multipliers, for example, first to eighth multipliers MUL(0)~MUL(7). The first to eighth multipliers MUL(0)~MUL(7) may receive first to eighth weight data W1~W8 from a left memory bank 110(L) of the first memory circuit 110, respectively. In addition, the first to eighth multipliers MUL(0)~MUL(7) may receive first to eighth vector data V1~V8 from a first global buffer 121 of the second memory circuit 120, respectively. The first to eighth weight data W1~W8 may constitute the left weight data W(L)s described with reference to FIG. 1, and the first to eighth vector data V1~V8 may constitute the left vector data V(L)s described with reference to FIG. 1. The first to eighth multipliers MUL(0)~MUL(7) may perform multiplying calculations on the first to eighth weight data W1~W8 and the first to eighth vector data V1~V8 to generate first to eighth multiplication result data WV1~WV8, respectively. The first to eighth multiplication result data WV1~WV8 may be transmitted to the left adder tree 331_A(L).

The left adder tree 331_A(L) may perform an adding calculation on the first to eighth multiplication result data WV1~WV8 that are output from the left multiplication circuit 331_M(L). The left adder tree 331_A(L) may generate and output left multiplication/addition result data D_MA(L) as a result of the adding calculation. The left adder tree 331_A(L) may include a plurality of adders ADDs that are arrayed to have a hierarchical structure such as a tree structure. In the present embodiment, the left adder tree 331_A(L) may be comprised of a plurality of full-adders and a half-adder. However, the present embodiment is merely an example of the present disclosure. Accordingly, in some other embodiment, the left adder tree 331_A(L) may be comprised of only a plurality of half-adders. In the present embodiment, two full-adders ADD(11) and ADD(12) may be disposed in a first stage that is located at a highest level of the left adder tree 331_A(L), and two full-adders ADD (21) and ADD(22) may also be disposed in a second stage that is located at a second highest level of the left adder tree 331_A(L). In addition, one full-adder ADD(31) may be disposed in a third stage that is located at a third highest level of the left adder tree 331_A(L), and one full-adder ADD(41) may also be disposed in a fourth stage that is located at a fourth highest level of the left adder tree 331_A(L). Moreover, one half-adder ADD(51) may be disposed in a fifth stage that is located at a lowest level of the left adder tree 331_A(L).

The first full-adder ADD(11) in the first stage may perform an adding calculation on the first to third multiplication result data WV1~WV3 that are output from the first to third multipliers MUL(0)~MUL(2) of the left multiplication circuit 331_M(L), thereby generating and outputting added data S11 and a carry C11. The second full-adder ADD(12) in the first stage may perform an adding calculation on the sixth to eighth multiplication result data WV6~WV8 that are output from the sixth to eighth multipliers MUL(5)~MUL(7) of the left multiplication circuit 331_M(L), thereby generating and outputting added data S12 and a carry C12. The first full-adder ADD(21) in the second stage may perform an adding calculation on the added data S11 and the carry C11 that are output from the first full-adder ADD(11) in the first stage and the fourth multiplication result data WV4 that is output from the fourth multiplier MUL(3) of the left multiplication circuit 331_M(L), thereby generating and outputting added data S21 and a carry C21. The second full-adder ADD(22) in the second stage may perform an adding calculation on the added data S12 and the carry C12 that are output from the second full-adder ADD(12) in the first stage and the fifth multiplication result data WV5 that is output from the fifth multiplier MUL(4) of the left multiplication circuit 331_M(L), thereby generating and outputting added data S22 and a carry C22.

The full-adder ADD(31) in the third stage may perform an adding calculation on the added data S21 and the carry C21 that are output from the first full-adder ADD(21) in the second stage and the added data S22 that is output from the second full-adder ADD(22) in the second stage, thereby generating and outputting added data S31 and a carry C31. The full-adder ADD(41) in the fourth stage may perform an adding calculation on the added data S31 and the carry C31 that are output from the full-adder ADD(31) in the third stage and the carry C(22) that is output from the second full-adder ADD(22) in the second stage, thereby generating and outputting added data S41 and a carry C41. The half-adder ADD(51) in the fifth stage may perform an adding calculation on the added data S41 and the carry C41 that are output from the full-adder ADD(41) in the fourth stage, thereby generating and outputting the left multiplication/addition result data D_MA(L). The left multiplication/addition result data D_MA(L) that is output from the half-adder ADD(51) in the fifth stage of the left multiplication circuit 331_M(L) may be transmitted to the additional adder 335.

The right multiplication/addition circuit 331(R) may include a right multiplication circuit 331_M(R) and a right adder tree 331_A(R), as illustrated in FIG. 16. The right multiplication circuit 331_M(R) may include a plurality of multipliers, for example, ninth to sixteenth multipliers MUL(8)~MUL(15). The ninth to sixteenth multipliers MUL(8) ~MUL(15) may receive ninth to sixteenth weight data W9~W16 from a right memory bank 110(R) of the first memory circuit 110, respectively. In addition, the ninth to sixteenth multipliers MUL(8)~MUL(15) may receive ninth to sixteenth vector data V9~V16 from a second global buffer 122 of the second memory circuit 120, respectively. The ninth to sixteenth weight data W9~W16 may constitute the right weight data W(R)s described with reference to FIG. 1, and the ninth to sixteenth vector data V9~V16 may constitute the right vector data V(R)s described with reference to FIG. 1. The ninth to sixteenth multipliers MUL(8)~MUL(15) of the right multiplication circuit 331_M(R) may perform multiplying calculations on the ninth to sixteenth weight data W9~W16 and the ninth to sixteenth vector data V9~V16 to generate ninth to sixteenth multiplication result data WV9~WV16, respectively. The ninth to sixteenth multiplication result data WV9~WV16 may be transmitted to the right adder tree 331_A(R).

The right adder tree 331_A(R) may perform an adding calculation on the ninth to sixteenth multiplication result data WV9~WV16 that are output from the right multiplication circuit 331_M(R). The right adder tree 331_A(R) may generate and output right multiplication/addition result data D_MA(R) as a result of the adding calculation. The right adder tree 331_A(R) may include a plurality of adders ADDs that are arrayed to have a hierarchical structure such as a tree structure. In the present embodiment, the right adder tree 331_A(R) may be comprised of a plurality of full-adders and a half-adder. However, the present embodiment is merely an example of the present disclosure. Accordingly, in some other embodiment, the right adder tree 331_A(R) may be comprised of only a plurality of half-adders. In the present embodiment, two full-adders ADD(13) and ADD(14) may be disposed in a first stage that is located at a highest level of the right adder tree 331_A(R), and two full-adders ADD(23) and ADD(24) may also be disposed in a second stage that is located at a second highest level of the right adder tree 331_A(R). In addition, one full-adder ADD(32) may be disposed in a third stage that is located at a third highest level of the right adder tree 331_A(R), and one full-adder ADD(42) may also be disposed in a fourth stage that is located at a fourth highest level of the right adder tree 331_A(R). Moreover, one half-adder ADD(52) may be disposed in a fifth stage that is located at a lowest level of the right adder tree 331_A(R).

The first full-adder ADD(13) in the first stage may perform an adding calculation on the ninth to eleventh multiplication result data WV9~WV11 that are output from the ninth to eleventh multipliers MUL(8)~MUL(10) of the right multiplication circuit 331_M(R), thereby generating and outputting added data S13 and a carry C13. The second full-adder ADD(14) in the first stage may perform an adding calculation on the fourteenth to sixteenth multiplication result data WV14~WV16 that are output from the fourteenth to sixteenth multipliers MUL(13)~MUL(15) of the right multiplication circuit 331_M(R), thereby generating and outputting added data S14 and a carry C14. The first full-adder ADD(23) in the second stage may perform an adding calculation on the added data S13 and the carry C13 that are output from the first full-adder ADD(13) in the first stage and the twelfth multiplication result data WV12 that is output from the twelfth multiplier MUL(11) of the right multiplication circuit 331_M(R), thereby generating and outputting added data S23 and a carry C23. The second full-adder ADD(24) in the second stage may perform an adding calculation on the added data S14 and the carry C14 that are output from the second full-adder ADD(14) in the first stage and the thirteenth multiplication result data WV13 that is output from the thirteenth multiplier MUL(12) of the right multiplication circuit 331_M(R), thereby generating and outputting added data S24 and a carry C24.

The full-adder ADD(32) in the third stage may perform an adding calculation on the carry 23 that is output from the first full-adder ADD(23) in the second stage and the added data S24 and the carry C24 that are output from the second full-adder ADD(24) in the second stage, thereby generating and outputting added data S32 and a carry C32. The full-adder ADD(42) in the fourth stage may perform an adding calculation on the added data S32 and the carry C32 that are output from the full-adder ADD(32) in the third stage and the added data S(23) that is output from the first full-adder ADD(23) in the second stage, thereby generating and outputting added data S42 and a carry C42. The half-adder ADD(52) in the fifth stage may perform an adding calculation on the added data S42 and the carry C42 that are output from the full-adder ADD(42) in the fourth stage, thereby generating and outputting the right multiplication/addition result data D_MA(R). The right multiplication/addition result data D_MA(R) that is output from the half-adder ADD(52) in the fifth stage of the right multiplication circuit 331_M(R) may be transmitted to the additional adder 335.

Referring again to FIG. 14, the first accumulative addition time "tACC1" it takes the left accumulator 140(L) of the AI accelerator 300 to perform the accumulative adding calculation may be longer than the CAS to CAS delay time "tCCD" and may be shorter than twice the CAS to CAS delay time "tCCD", like the AI accelerator 100 described with reference to FIG. 1. Similarly, the second accumulative addition time "tACC2" it takes the right accumulator 140(R) of the AI accelerator 300 to perform the accumulative adding calculation may also be longer than the CAS to CAS delay time "tCCD" and may be shorter than twice the CAS to CAS delay time "tCCD". As such, the left accumulator 140(L) and the right accumulator 140(R) may perform an accumulative adding calculation within the first accumulative addition time "tACC1" and the second accumulative addition time "tACC2", which are shorter than twice the CAS to CAS delay time "tCCD", respectively. Thus, it may be unnecessary to adjust the CAS to CAS delay time "tCCD" during the MAC operation. In addition, in the event that each memory bank is divided into the left memory bank 110(L) and the right memory bank 110(R), the left accumulator 140(L) may be realized by using an accumulator that is included in a left MAC operator and the right accumulator 140(R) may be realized by using an accumulator that is included in a right MAC operator. Thus, it may be unnecessary to additionally dispose accumulators occupying a relatively large area in the AI accelerator 300. Accordingly, it may be possible to realize compact AI accelerators.

Figure 17:
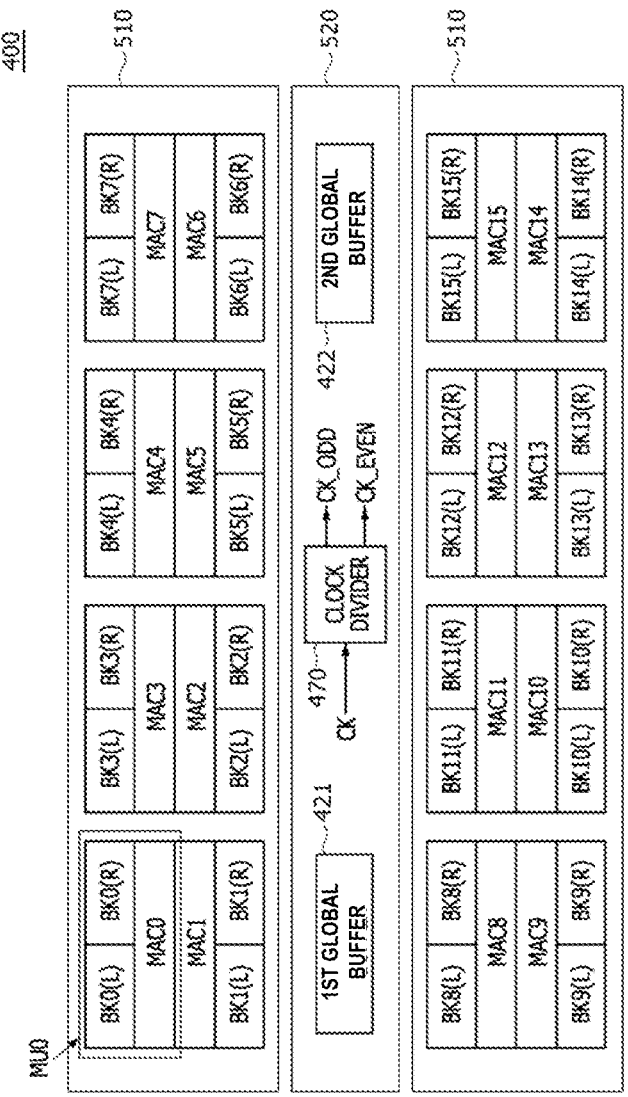
FIG. 17 is a block diagram illustrating an artificial intelligence accelerator according to yet another embodiment of the present disclosure.

FIG. 17 is a block diagram illustrating an AI accelerator 400 according to yet another embodiment of the present disclosure. Referring to FIG. 17, the AI accelerator 400 may include a memory/arithmetic region 510 and a peripheral region 520. The memory/arithmetic region 510 may include a plurality of memory banks BKs and a plurality of MAC operators MACs. The peripheral region 520 may include a first global buffer 421, a second global buffer 422, and a clock divider 470. Although not shown in FIG. 17, a data I/O circuit may be disposed in the peripheral region 520, and the data I/O circuit disposed in the peripheral region 520 may include left data I/O terminals and right data I/O terminals, like the data I/O circuit 160 described with reference to FIG. 1. In the present embodiment, it may be assumed that the plurality of memory banks BKs include first to sixteenth memory banks BK0~BK15. In addition, it may be assumed that the plurality of MAC operators MACs include first to sixteenth MAC operators MAC0~MAC15.

Each of the first to sixteenth memory banks BK0~BK15 may be divided into a left memory bank disposed in a left region and a right memory bank disposed in a right region. Accordingly, the first to sixteenth memory banks BK0~BK15 may include first to sixteenth left memory banks BK0(L)~BK15(L) and first to sixteenth right memory banks BK0(R)~BK15(R). For example, the first memory bank BK0 may include the first left memory bank BK0(L) disposed in the left region and the first right memory bank BK0(R) disposed in the right region, and the second memory bank BK1 may include the second left memory bank BK1(L) disposed in the left region and the second right memory bank BK1(R) disposed in the right region. Similarly, the sixteenth memory bank BK15 may include the sixteenth left memory bank BK15(L) disposed in the left region and the sixteenth right memory bank BK15(R) disposed in the right region. In the present embodiment, the first to sixteenth left memory banks BK0(L)~BK15(L) may be disposed to be adjacent to the first to sixteenth right memory banks BK0(R)~BK15(R), respectively. For example, the first left memory bank BK0(L) and the first right memory bank BK0(R) may be disposed to be adjacent to each other and to share a row decoder with each other. The second left memory bank BK1(L) and the second right memory bank BK1(R) may also be disposed to be adjacent to each other. In the same way, the sixteenth left memory bank BK15(L) and the sixteenth right memory bank BK15(R) may also be disposed to be adjacent to each other.

The first to sixteenth MAC operators MAC0~MAC15 may be disposed to be allocated to the first to sixteenth memory banks BK0~BK15, respectively. For example, the first MAC operator MAC0 may be allocated to both of the first left memory bank BK0(L) and the first right memory bank BK0(R). In addition, the second MAC operator MAC1 may be allocated to both of the second left memory bank BK1(L) and the second right memory bank BK1(R). Similarly, the sixteenth MAC operator MAC15 may be allocated to both of the sixteenth left memory bank BK15(L) and the sixteenth right memory bank BK15(R). Each of the first to sixteenth MAC operators MAC0~MAC15 and one of the first to sixteenth memory banks may constitute one MAC unit MU. For example, as illustrated in FIG. 17, the first left memory bank BK0(L), the first right memory bank BK0(R), and the first MAC operator MAC0 may constitute a first MAC unit MU0. Although not indicated in FIG. 17, each of second to sixteenth MAC units may also be configured in the same way as described above. A MAC operator included in a certain MAC unit may receive left weight data from a left memory bank included in the certain MAC unit and may receive right weight data from a right memory bank included in the certain MAC unit. Thus, the first MAC operator MAC0 may receive left weight data from the first left memory bank BK0(L) and may receive right weight data from the first right memory bank BK0(R).

The first global buffer 421 may transmit left vector data to each of the first to sixteenth MAC operators MAC0~MAC15. The second global buffer 422 may transmit right vector data to each of the first to sixteenth MAC operators MAC0~MAC15. The clock divider 470 may divide a clock signal CK, which is input to the AI accelerator 400, to generate and output an odd clock signal CK_ODD and an even clock signal CK_EVEN. The odd clock signal CK_ODD may be transmitted to a left accumulator in each of the first to sixteenth MAC operators MAC0~MAC15. The even clock signal CK_EVEN may be transmitted to a right accumulator in each of the first to sixteenth MAC operators MAC0~MAC15. The first global buffer 421, the second global buffer 422, and the clock divider 470 may have substantially the same configurations as the first global buffer 121, the second global buffer 122, and the clock divider 170 of the AI accelerator 100 described with reference to FIG. 1, respectively.

Figure 18:
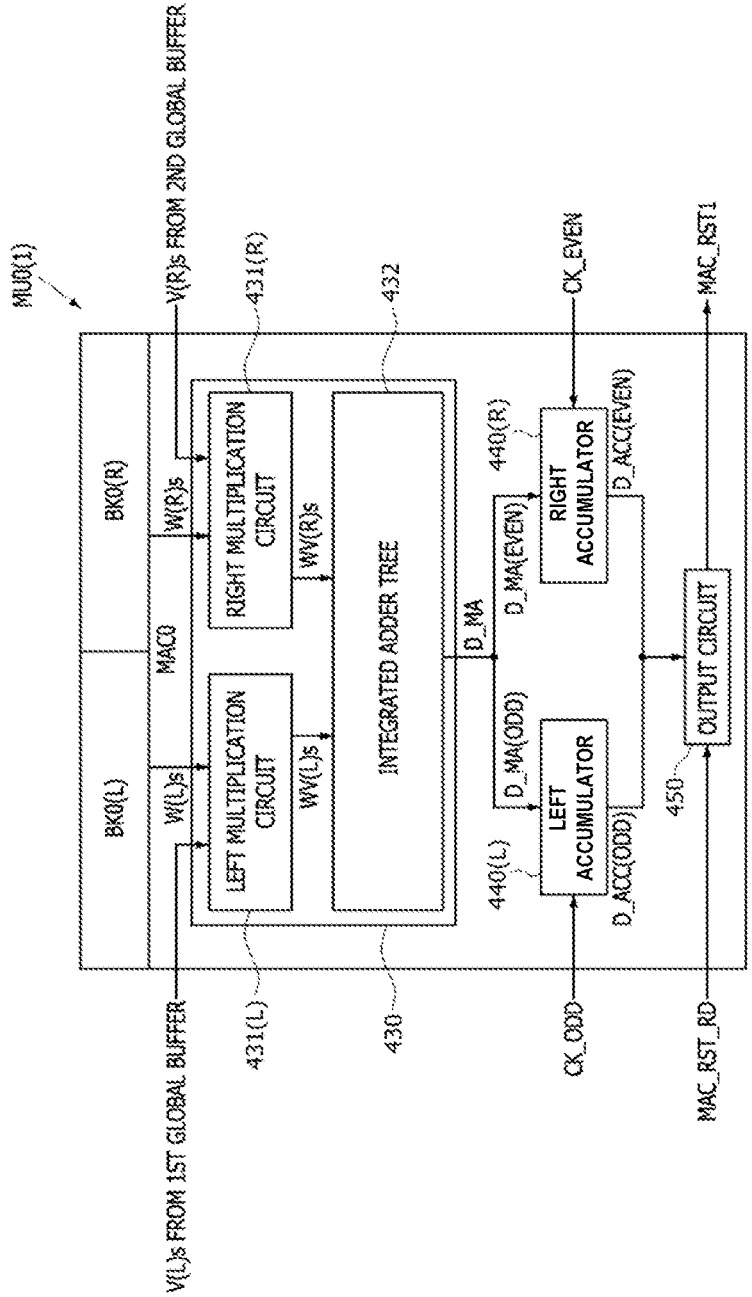
FIG. 18 is a block diagram illustrating an example of a configuration of a first MAC unit included in the artificial intelligence accelerator of FIG. 17.

FIG. 18 is a block diagram illustrating a first MAC unit MU0(1) that corresponds to an example of the first MAC unit MU0 included in the AI accelerator 400 of FIG. 17. The following descriptions for the first MAC unit MU0(1) may be equally applied to each of the remaining MAC units. Referring to FIG. 18, the first MAC unit MU0(1) may be comprised of the first left memory bank BK0(L), the first right memory bank BK0(R), and the first MAC operator MAC0, as described with reference to FIG. 17. The first left memory bank BK0(L) and the first right memory bank BK0(R) may have substantially the same configurations as the left memory bank 110(L) and the right memory bank 110(R) included in the AI accelerator 100 described with reference to FIG. 1, respectively. The first MAC operator MAC0 may include a multiplication circuit/adder tree 430, a left accumulator 440(L), a right accumulator 440(R), and an output circuit 450. The multiplication circuit/adder tree 430 may include a left multiplication circuit 431(L), a right multiplication circuit 431(R), and an integrated adder tree 432. The left multiplication circuit 431(L), the right multiplication circuit 431(R), the integrated adder tree 432, the left accumulator 440(L), the right accumulator 440(R), and the output circuit 450 constituting the first MAC operator MAC0 may have substantially the same configurations as the left multiplication circuit 131(L), the right multiplication circuit 131(R), the integrated adder tree 132, the left accumulator 140(L), the right accumulator 140(R), and the output circuit 150 constituting the AI accelerator 100 illustrated in FIG. 1, respectively. Accordingly, the left multiplication circuit 431(L), the right multiplication circuit 431(R), the integrated adder tree 432, the left accumulator 440(L), the right accumulator 440(R), and the output circuit 450 constituting the first MAC operator MAC0 may perform substantially the same operations as the left multiplication circuit 131(L), the right multiplication circuit 131(R), the integrated adder tree 132, the left accumulator 140(L), the right accumulator 140(R), and the output circuit 150 constituting the AI accelerator 100 illustrated in FIG. 1, respectively.

Figure 19:
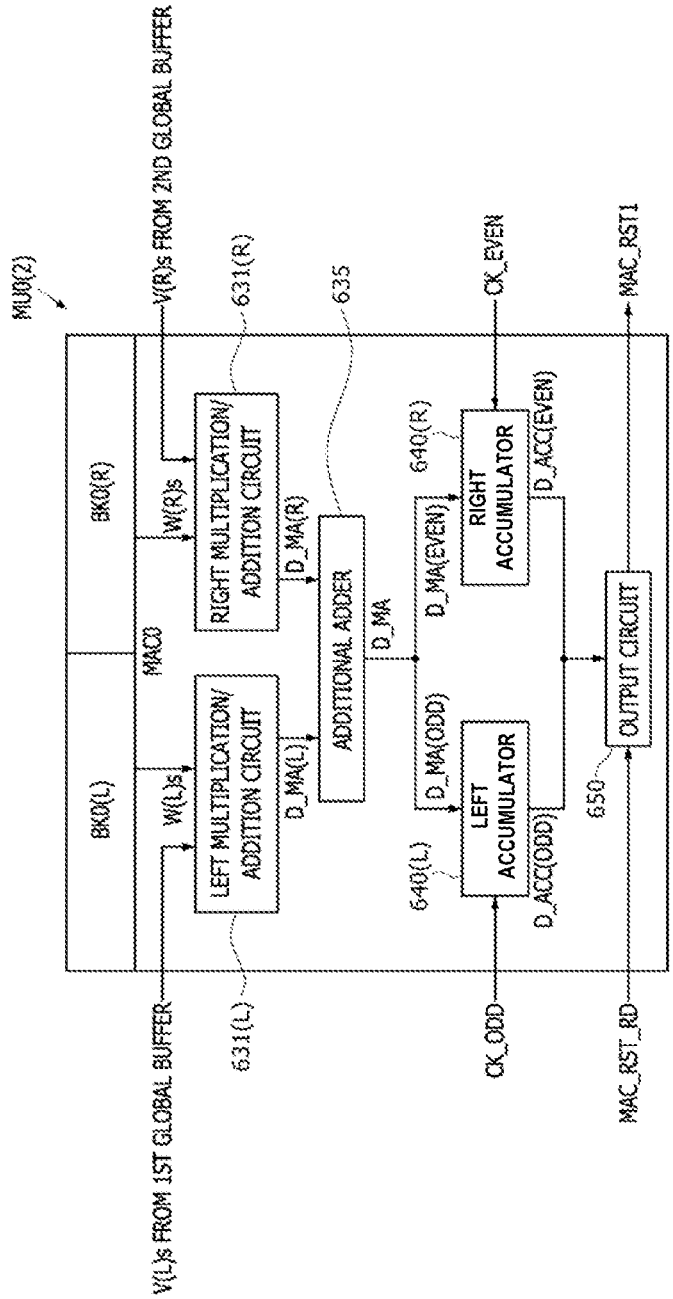
FIG. 19 is a block diagram illustrating another example of a configuration of a first MAC unit included in the artificial intelligence accelerator of FIG. 17.

FIG. 19 is a block diagram illustrating a first MAC unit MU0(2) that corresponds to another example of the first MAC unit MU0 included in the AI accelerator 400 of FIG. 17. The following descriptions for the first MAC unit MU0(2) may be equally applied to each of the remaining MAC units. Referring to FIG. 19, the first MAC unit MU0(2) may be comprised of the first left memory bank BK0(L), the first right memory bank BK0(R), and the first MAC operator MAC0, as described with reference to FIG. 17. The first left memory bank BK0(L) and the first right memory bank BK0(R) may have substantially the same configurations as the left memory bank 110(L) and the right memory bank 110(R) included in the AI accelerator 100 described with reference to FIG. 1, respectively. The first MAC operator MAC0 may include a left multiplication/addition circuit 631(L), a right multiplication/addition circuit 631(R), an additional adder 635, a left accumulator 640(L), a right accumulator 640(R), and an output circuit 650. The left multiplication/addition circuit 631(L), the right multiplication/addition circuit 631(R), the additional adder 635, the left accumulator 640(L), the right accumulator 640(R), and the output circuit 650 constituting the first MAC operator MAC0 may have substantially the same configurations as the left multiplication/addition circuit 331(L), the right multiplication/addition circuit 331(R), the additional adder 335, the left accumulator 140(L), the right accumulator 140(R), and the output circuit 150 constituting the AI accelerator 300 illustrated in FIG. 14, respectively. Accordingly, the left multiplication/addition circuit 631(L), the right multiplication/addition circuit 631(R), the additional adder 635, the left accumulator 640(L), the right accumulator 640(R), and the output circuit 650 constituting the first MAC operator MAC0 may perform substantially the same operations as the left multiplication/addition circuit 331(L), the right multiplication/addition circuit 331(R), the additional adder 335, the left accumulator 140(L), the right accumulator 140(R), and the output circuit 150 constituting the AI accelerator 300 illustrated in FIG. 14, respectively.

Figure 20:
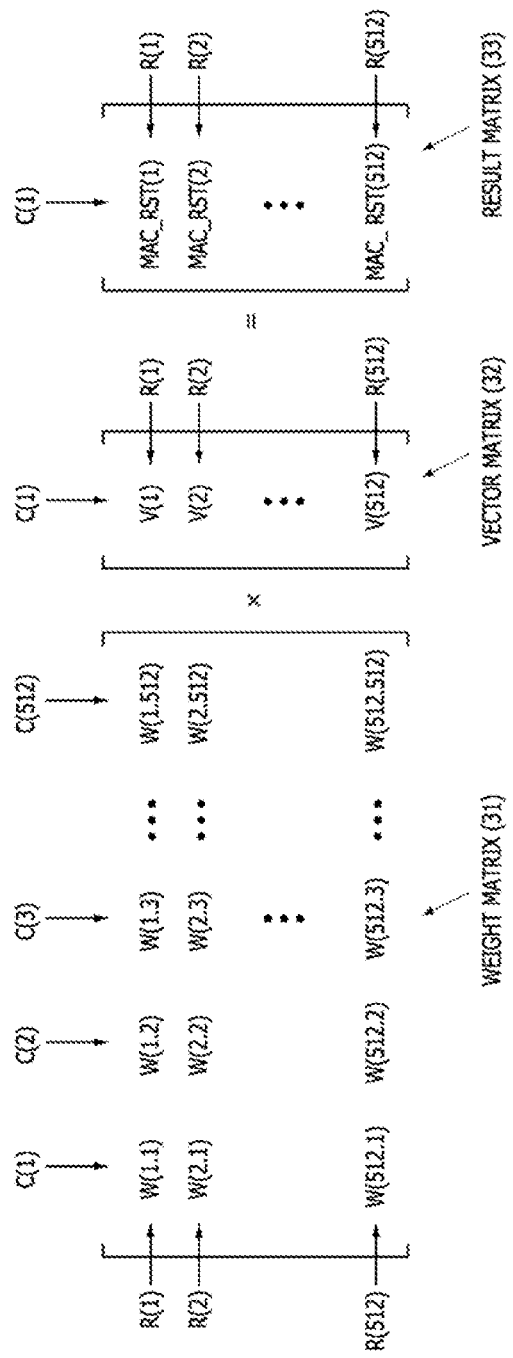
FIG. 20 illustrates a matrix multiplying calculation executed by a MAC operation of the artificial intelligence accelerator of FIG. 17.

FIG. 20 illustrates a matrix multiplying calculation executed by a MAC operation of the AI accelerator 400 of FIG. 17. Referring to FIG. 20, the AI accelerator 400 may perform a MAC operation that is executed by a matrix multiplying calculation for multiplying a 'M×N' weight matrix 31 by a 'N×1' vector matrix 32 (where, "M" and "N" are natural numbers that are equal to or greater than two). The term "matrix multiplying calculation" may be construed as with the same meaning as the term "MAC operation". The AI accelerator 400 may generate and output a 'M×1' result matrix 33 as a result of the MAC operation on the 'M×N' weight matrix 31 and the 'N×1' vector matrix 32. Hereinafter, it may be assumed that the weight matrix 31 has 512 rows (i.e., first to 512th rows R(1)~R(512)) and 512 columns (i.e., first to 512th columns C(1)~C(512)) and the vector matrix 32 has 512 rows (i.e., first to 512th rows R(1)~R(512)) and one column (i.e., a first column C(1)). Accordingly, the result matrix 33 that is generated by the matrix multiplying calculation on the weight matrix 31 and the vector matrix 32 may have 512 rows (i.e., first to 512th rows R(1)~R(512)) and one column (i.e., a first column C(1)). The weight matrix 31 may have 512, 512 sets of weight data W(1.1)~W(1.512), . . . , and W(512.1)~W(512.512) as elements. The vector matrix 32 may have 512 sets of vector data V(1)~V(512) as elements. The result matrix 33 that is generated by the MAC operation may have 512 sets of MAC result data MAC_RST(1)~MAC_RST(512) as elements.

The AI accelerator 400, according to the present embodiment, may have a plurality of memory banks BKs and a plurality of MAC operators MACs. Thus, a plurality of MAC operations may be simultaneously performed by the plurality of MAC operators MACs. Specifically, the first to sixteenth MAC operators MAC0~MAC15 of the AI accelerator 400 may perform a first MAC operation on the weight data W(1.1)~W(1.512), . . . , and W(16.1)~W(16.512) arrayed in the first to sixteenth rows R(1)~R(16) of the weight matrix 31 and the vector data V(1)~V(512) arrayed in the first to 512nd rows R(1)~R(512) of the vector matrix 32, thereby generating and output sixteen sets of MAC result data (i.e., first to sixteenth MAC result data MAC_RST(1)~MAC_RST(16)), respectively. Subsequently, the first to sixteenth MAC operators MAC0~MAC15 of the AI accelerator 400 may perform a second MAC operation on the weight data W(17.1)~W(17.512), . . . , and W(32.1)~W(32.512) arrayed in the seventeenth to 32nd rows R(17)~R(32) of the weight matrix 31 and the vector data V(1)~V(512) arrayed in the first to 512nd rows R(1)~R(512) of the vector matrix 32, thereby generating sixteen sets of MAC result data (i.e., seventeenth to 32nd MAC result data MAC_RST(17)~MAC_RST(32)), respectively. In the same way, the first to sixteenth MAC operators MAC0~MAC15 of the AI accelerator 400 may perform third to 32nd MAC operations to generate 33rd to 512th MAC result data MAC_RST(33)~MAC_RST(512).

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An artificial intelligence (AI) accelerator comprising:
memory circuits configured to output weight data and vector data;
a multiplication circuit/adder tree configured to perform a multiplying/adding calculation on the weight data and the vector data to generate and output multiplication/addition result data;
a left accumulator synchronized with an odd clock signal to perform an accumulative adding calculation on odd-numbered multiplication/addition result data of the multiplication/addition result data and a left latched data; and
a right accumulator synchronized with an even clock signal to perform an accumulative adding calculation on even-numbered multiplication/addition result data of the multiplication/addition result data and a right latched data.

2. The AI accelerator of claim 1, wherein the memory circuits include:
a first memory circuit configured to transmit the weight data to the multiplication circuit/adder tree; and
a second memory circuit configured to transmit the vector data to the multiplication circuit/adder tree.

3. The AI accelerator of claim 2,
wherein the first memory circuit includes a memory bank;
wherein the memory bank includes a left memory bank and a right memory bank that are physically distinguished from each other;

wherein the left memory bank is configured to provide the multiplication circuit/adder tree with left weight data of the weight data; and wherein the right memory bank is configured to provide the multiplication circuit/adder tree with right weight data of the weight data.

4. The AI accelerator of claim 3, further comprising a data input/output (I/O) circuit configured to provide a means for data transmission between the AI accelerator and an external device that is coupled to the AI accelerator, wherein the data I/O circuit includes:

a plurality of left data I/O terminals configured to provide transmission paths of read data that is output from the left memory bank or write data that is input to the left memory bank; and a plurality of right data I/O terminals configured to provide transmission paths of read data that is output from the right memory bank or write data that is input to the right memory bank.

5. The AI accelerator of claim 2, wherein the second memory circuit includes:

a first global buffer configured to provide the multiplication circuit/adder tree with left vector data of the vector data; and a second global buffer configured to provide the multiplication circuit/adder tree with right vector data of the vector data.

6. The AI accelerator of claim 1, further comprising a clock divider configured to divide a clock signal that is input to the AI accelerator to generate the odd clock signal and the even clock signal and configured to transmit the odd clock signal and the even clock signal to the left accumulator and the right accumulator, respectively.

7. The AI accelerator of claim 6, wherein the clock signal has a cycle that is equal to a CAS to CAS delay time;

wherein the odd clock signal and the even clock signal have a cycle that is equal to twice the CAS to CAS delay time; and wherein the CAS to CAS delay corresponds to an interval time between column addresses.

8. The AI accelerator of claim 7, wherein the multiplication circuit/adder tree outputs the multiplication/addition result data at an interval time of the CAS to CAS delay time;

wherein the left accumulator receives the odd-numbered multiplication/addition result data at an interval time of twice the CAS to CAS delay time; and wherein the right accumulator receives the even-numbered multiplication/addition result data at an interval time of twice the CAS to CAS delay time.

9. The AI accelerator of claim 8, wherein a first time it takes the left accumulator to perform the accumulative adding calculation, is set to be shorter than twice the CAS to CAS delay time; and wherein a second time it takes the right accumulator to perform the accumulative adding calculation, is set to be shorter than twice the CAS to CAS delay time.

10. The AI accelerator of claim 1, wherein the weight data includes left weight data and right weight data;

wherein the vector data includes left vector data and right vector data; and wherein the multiplication circuit/adder tree includes:

a left multiplication circuit configured to perform a multiplying calculation on the left weight data and the left vector data to generate and output left multiplication result data;

a right multiplication circuit configured to perform a multiplying calculation on the right weight data and the right vector data to generate and output right multiplication result data; and an integrated adder tree configured to perform an adding calculation on the left multiplication result data and the right multiplication result data to generate and output the multiplication/addition result data.

11. The AI accelerator of claim 10, wherein the left accumulator includes:

a first left register configured to receive and output the odd-numbered multiplication/addition result data in synchronization with the odd clock signal;

a second left register configured to receive and output the left latched data in synchronization with the odd clock signal;

a left accumulative adder configured to perform an adding calculation on the odd-numbered multiplication/addition result data and the left latched data that is output from the first left register and the second left register, respectively, to generate and output odd-numbered accumulated data; and a left latch circuit configured to latch the odd-numbered accumulated data that is output from the left accumulative adder and to output a latched data of the odd-numbered accumulated data as the left latched data that are fed back to the second left register, in response to a first latch clock signal with a first logic level.

12. The AI accelerator of claim 11, wherein the odd-numbered multiplication/addition result data has a floating-point format with a first sign datum, first exponent data, and first mantissa data;

wherein the left latched data has a floating-point format with a second sign datum, second exponent data, and second mantissa data;

wherein the odd-numbered accumulated data has a floating-point format with a third sign datum, third exponent data, and third mantissa data; and wherein the left accumulative adder includes:

an exponent operation circuit configured to perform an exponent operation on the first exponent data and the second exponent data that is output from the first left register and the second left register, respectively, to generate and output maximum exponent data, first shift data, and second shift data;

a mantissa operation circuit configured to perform a mantissa operation on the first mantissa data and the second mantissa data to generate and output the third sign datum and interim mantissa addition data; and a normalizer configured to perform a normalization operation by using the maximum exponent data, the interim mantissa addition data, and the third sign datum as input data, thereby generating and outputting the third exponent data and the third mantissa data.

13. The AI accelerator of claim 12, wherein the exponent operation circuit includes:

an exponent subtraction circuit configured to perform a subtracting calculation that subtracts the second exponent data from the first exponent data to generate and output a sign signal and low-order data of exponent subtraction data;

a 2's complement circuit configured to generate and output 2's complement data of the low-order data of the exponent subtraction data;

a first selector configured to output the low-order data of the exponent subtraction data or data with a value of "0" as the first shift data according to a level of the sign signal;

a second selector configured to output the 2's complement data of the low-order data of the exponent subtraction data or data with a value of "0" as the second shift data according to a level of the sign signal; and a third selector configured to output the first exponent data or the second exponent data as the maximum exponent data according to a level of the sign signal.

14. The AI accelerator of claim 13, wherein the exponent subtraction circuit includes:

a 2's complement processor configured to generate and output 2's complement data of the second exponent data;

an exponent adder configured to add the 2's complement data of the second exponent data to the first exponent data to generate and output a most significant bit (MSB) datum of the exponent subtraction data and the low-order data obtained by removing the MSB datum from the exponent subtraction data; and an exponent comparison circuit configured to generate and output the sign signal, its level being determined according to the MSB datum of the exponent subtraction data.

15. The AI accelerator of claim 14, wherein the exponent comparison circuit is configured to output the sign signal with a level that corresponds to a value of "1" when the MSB datum of the exponent subtraction data has a value of "0" and is configured to output the sign signal with a level that corresponds to a value of "0" when the MSB datum of the exponent subtraction data has a value of "1".

16. The AI accelerator of claim 13, wherein, when the sign signal has a level that corresponds to a value of "0", the first to third selectors are configured to output data with a value of "0" as the first shift data, the 2's complement data of the low-order data of the exponent subtraction data as the second shift data, and the first exponent data as the maximum exponent data, respectively; and wherein, when the sign signal has a level that corresponds to a value of "1", the first to third selectors are configured to output the low-order data of the exponent subtraction data as the first shift data, data with a value of "0" as the second shift data, and the second exponent data as the maximum exponent data, respectively.

17. The AI accelerator of claim 12, wherein the mantissa operation circuit includes:

a negative number processing circuit configured to perform a negative number processing operation on the first mantissa data and the second mantissa data to generate and output first interim mantissa data and second interim mantissa data;

a shift circuit configured to shift the first interim mantissa data by the number of bits that correspond to an absolute value of the first shift data to generate and output third interim mantissa data and configured to shift the second interim mantissa data by the number of bits that correspond to an absolute value of the second shift data to generate and output fourth interim mantissa data; and a mantissa addition circuit configured to receive the first sign datum, the second sign datum, the third interim mantissa data, and the fourth interim mantissa data to generate and output the third sign datum and the interim mantissa data.

18. The AI accelerator of claim 17, wherein the negative number processing circuit includes:

a first 2's complement circuit configured to generate and output 2's complement data of the first mantissa data;

a second 2's complement circuit configured to generate and output 2's complement data of the second mantissa data;

a first selector configured to output the first mantissa data or the 2's complement data of the first mantissa data as the first interim mantissa data according to a level of the first sign datum; and a second selector configured to output the 2's complement data of the second mantissa data or the second mantissa data as the second interim mantissa data according to a level of the second sign datum.

19. The AI accelerator of claim 18, wherein the first selector selectively outputs the first mantissa data when the first sign datum has a level that corresponds to a value of "0" and selectively outputs the 2's complement data of the first mantissa data when the first sign datum has a level that corresponds to a value of "1"; and wherein the second selector selectively outputs the second mantissa data when the second sign datum has a level that corresponds to a value of "0" and selectively outputs the 2's complement data of the second mantissa data when the second sign datum has a level that corresponds to a value of "1".

20. The AI accelerator of claim 17, wherein the shift circuit includes:

a first mantissa shifter configured to receive the first shift data and the first interim mantissa data to generate and output the third interim mantissa data; and a second mantissa shifter configured to receive the second shift data and the second interim mantissa data to generate and output the fourth interim mantissa data.

21. The AI accelerator of claim 17, wherein the mantissa addition circuit includes:

a mantissa adder configured to add the third interim mantissa data to the fourth interim mantissa data to generate and output a mantissa addition data and configured to generate and output the third sign datum that are determined by the first sign datum, the second sign datum, and the mantissa addition data;

a 2's complement circuit configured to generate and output 2's complement data of the mantissa addition data; and a selector configured to selectively output the mantissa addition data or the 2's complement data of the mantissa addition data as the interim mantissa addition data according to a level of the third sign datum.

22. The AI accelerator of claim 21, wherein the mantissa adder outputs the third sign datum with a value of "0" when both of the first and second sign data have a value of "0"; and wherein the mantissa adder outputs the third sign datum with a value of "1" when both of the first and second sign data have a value of "1".

23. The AI accelerator of claim 21, wherein the selector selectively outputs the mantissa addition data as the interim mantissa addition data when the third sign datum has a level that corresponds to a value of "0" and selectively outputs the 2's complement data of the mantissa addition data as the interim mantissa addition data when the third sign datum has a level that corresponds to a value of "1".

24. The AI accelerator of claim 12, wherein the normalizer includes:
a "1" search circuit configured to search a position in which a binary number of "1" is first located in a right direction from a leftmost bit of the interim mantissa addition data and configured to generate third shift data SF3<7:0> as a search result;
a mantissa shifter configured to shift the interim mantissa addition data by the number of bits that correspond to a value of the third shift data to generate and output the third mantissa data; and
an exponent adder configured to add the maximum exponent data to the third shift data to generate and output the third exponent data.

25. The AI accelerator of claim 24,
wherein the first mantissa data and the second mantissa data are on standby while the exponent operation circuit performs the exponent operation; and
wherein the maximum exponent data are on standby while the mantissa operation circuit performs the mantissa operation and the "1" search circuit of the normalizer operates.

26. The AI accelerator of claim 10, wherein the right accumulator includes:
a first right register configured to receive and output the even-numbered multiplication/addition result data in synchronization with the even clock signal;
a second right register configured to receive and output the right latched data in synchronization with the even clock signal;
a right accumulative adder configured to perform an adding calculation on the even-numbered multiplication/addition result data and the right latched data that is output from the first right register and the second right register, respectively, to generate and output even-numbered accumulated data; and
a right latch circuit configured to latch the even-numbered accumulated data that is output from the right accumulative adder and to output a latched data of the even-numbered accumulated data as the right latched data that are fed back to the second right register, in response to a second latch clock signal with a first logic level.

27. The AI accelerator of claim 26,
wherein the even-numbered multiplication/addition result data has a floating-point format with a first sign datum, first exponent data, and first mantissa data;
wherein the right latched data has a floating-point format with a second sign datum, second exponent data, and second mantissa data;
wherein the even-numbered accumulated data has a floating-point format with a third sign datum, third exponent data, and third mantissa data; and
wherein the right accumulative adder includes:
an exponent operation circuit configured to perform an exponent operation on the first exponent data and the second exponent data that is output from the first right register and the second right register, respectively, to generate and output maximum exponent data, first shift data, and second shift data;
a mantissa operation circuit configured to perform a mantissa operation on the first mantissa data and the second mantissa data to generate and output the third sign datum and interim mantissa addition data; and
a normalizer configured to perform a normalization operation by using the maximum exponent data, the interim mantissa addition data, and the third sign datum as input data, thereby generating and outputting the third exponent data and the third mantissa data.

28. An artificial intelligence (AI) accelerator comprising:
memory circuits configured to output weight data and vector data;
a left multiplication/addition circuit configured to perform a multiplying/adding calculation on left weight data of the weight data and left vector data of the vector data to generate and output left multiplication/addition result data;
a right multiplication/addition circuit configured to perform a multiplying/adding calculation on right weight data of the weight data and right vector data of the vector data to generate and output right multiplication/addition result data;
an additional adder configured to add the left multiplication/addition result data to the right multiplication/addition result data to generate and output multiplication/addition result data;
a left accumulator synchronized with an odd clock signal to perform an accumulative adding calculation on odd-numbered multiplication/addition result data of the multiplication/addition result data and a left latched data; and
a right accumulator synchronized with an even clock signal to perform an accumulative adding calculation on even-numbered multiplication/addition result data of the multiplication/addition result data and a right latched data.

29. The AI accelerator of claim 28, wherein the memory circuits include:
a first memory circuit configured to transmit the weight data to the left multiplication/addition circuit and the right multiplication/addition circuit; and
a second memory circuit configured to transmit the vector data to the left multiplication/addition circuit and the right multiplication/addition circuit.

30. The AI accelerator of claim 29,
wherein the first memory circuit includes a memory bank;
wherein the memory bank includes a left memory bank and a right memory bank that are physically distinguished from each other;
wherein the left memory bank is configured to provide the left multiplication/addition circuit with the left weight data; and
wherein the right memory bank is configured to provide the right multiplication/addition circuit with the right weight data.

31. The AI accelerator of claim 30, further comprising a data input/output (I/O) circuit configured to provide a means for data transmission between the AI accelerator and an external device that is coupled to the AI accelerator,
wherein the data I/O circuit includes:
a plurality of left data I/O terminals configured to provide transmission paths of read data that is output from the left memory bank or write data that is input to the left memory bank; and
a plurality of right data I/O terminals configured to provide transmission paths of read data that is output from the right memory bank or write data that is input to the right memory bank.

32. The AI accelerator of claim 29, wherein the second memory circuit includes:
a first global buffer configured to provide the left multiplication/addition circuit with the left vector data; and
a second global buffer configured to provide the right multiplication/addition circuit with the right vector data.

33. The AI accelerator of claim 28, further comprising a clock divider configured to divide a clock signal that is input to the AI accelerator to generate the odd clock signal and the even clock signal and configured to transmit the odd clock signal and the even clock signal to the left accumulator and the right accumulator, respectively.

34. The AI accelerator of claim 33,
wherein the clock signal has a cycle that is equal to a CAS to CAS delay time;
wherein the odd clock signal and the even clock signal have a cycle that is equal to twice the CAS to CAS delay time; and
wherein the CAS to CAS delay corresponds to an interval time between column addresses.

35. The AI accelerator of claim 34,
wherein the additional adder outputs the multiplication/addition result data at an interval time of the CAS to CAS delay time;
wherein the left accumulator receives the odd-numbered multiplication/addition result data at an interval time of twice the CAS to CAS delay time; and
wherein the right accumulator receives the even-numbered multiplication/addition result data at an interval time of twice the CAS to CAS delay time.

36. The AI accelerator of claim 35,
wherein a time it takes for a first arithmetic operation to be performed, the time it takes the left accumulator to perform the accumulative adding calculation, is set to be shorter than twice the CAS to CAS delay time; and
wherein a time it takes for a second arithmetic operation to be performed, the time it takes the right accumulator to perform the accumulative adding calculation, is set to be shorter than twice the CAS to CAS delay time.

37. The AI accelerator of claim 28, wherein the left multiplication/addition circuit includes:
a left multiplication circuit configured to perform a multiplying calculation on the left weight data and the left vector data to generate and output left multiplication result data; and
a left adder tree configured to perform an adding calculation on the left multiplication result data to generate and output the left multiplication/addition result data.

38. The AI accelerator of claim 28, wherein the right multiplication/addition circuit includes:
a right multiplication circuit configured to perform a multiplying calculation on the right weight data and the right vector data to generate and output right multiplication result data; and
a right adder tree configured to perform an adding calculation on the right multiplication result data to generate and output the right multiplication/addition result data.

39. An artificial intelligence (AI) accelerator comprising:
a plurality of memory banks configured to output weight data, wherein each of the plurality of memory banks includes a left memory bank and a right memory bank that are disposed separately;
a first global buffer and a second global buffer configured to output vector data; and
a plurality of multiplication/accumulation (MAC) operators disposed to be allocated to the plurality of memory banks, respectively,
wherein each of the plurality of MAC operators includes:
a multiplication circuit/adder tree configured to perform a multiplying/adding calculation on the weight data and the vector data to generate multiplication/addition result data;
a left accumulator synchronized with an odd clock signal to perform an accumulative adding calculation on odd-numbered multiplication/addition result data of the multiplication/addition result data and a left latched data; and
a right accumulator synchronized with an even clock signal to perform an accumulative adding calculation on even-numbered multiplication/addition result data of the multiplication/addition result data and a right latched data.

40. The AI accelerator of claim 39,
wherein the left memory bank is configured to provide a left multiplication/addition circuit with left weight data of the weight data; and
wherein the right memory bank is configured to provide a right multiplication/addition circuit with right weight data of the weight data.

41. The AI accelerator of claim 39, further comprising a clock divider configured to divide a clock signal that is input to the AI accelerator to generate the odd clock signal and the even clock signal and configured to transmit the odd clock signal and the even clock signal to the left accumulator and the right accumulator, respectively.

42. The AI accelerator of claim 41,
wherein the clock signal has a cycle that is equal to a CAS to CAS delay time;
wherein the odd clock signal and the even clock signal have a cycle that is equal to twice the CAS to CAS delay time; and
wherein the CAS to CAS delay corresponds to an interval time between column addresses.

43. The AI accelerator of claim 42,
wherein the multiplication circuit/adder tree outputs the multiplication/addition result data at an interval time of the CAS to CAS delay time;
wherein the left accumulator receives the odd-numbered multiplication/addition result data at an interval time of twice the CAS to CAS delay time; and
wherein the right accumulator receives the even-numbered multiplication/addition result data at an interval time of twice the CAS to CAS delay time.

44. The AI accelerator of claim 43,
wherein a first time it takes the left accumulator to perform the accumulative adding calculation, is set to be shorter than twice the CAS to CAS delay time; and
wherein a second time it takes the right accumulator to perform the accumulative adding calculation, is set to be shorter than twice the CAS to CAS delay time.

45. The AI accelerator of claim 39,
wherein the weight data includes left weight data and right weight data;
wherein the vector data includes left vector data and right vector data; and
wherein the multiplication circuit/adder tree includes:
a left multiplication circuit configured to perform a multiplying calculation on the left weight data and the left vector data to generate and output left multiplication result data;

a right multiplication circuit configured to perform a multiplying calculation on the right weight data and the right vector data to generate and output right multiplication result data; and an integrated adder tree configured to perform an adding calculation on the left multiplication result data and the right multiplication result data to generate and output the multiplication/addition result data.

46. An artificial intelligence (AI) accelerator comprising:

a plurality of memory banks configured to output weight data, wherein each of the plurality of memory banks includes a left memory bank and a right memory bank that are disposed separately;

a first global buffer and a second global buffer configured to output vector data; and a plurality of multiplication/accumulation (MAC) operators disposed to be allocated to the plurality of memory banks, respectively, wherein each of the plurality of MAC operators includes:

a left multiplication/addition circuit configured to perform a multiplying/adding calculation on left weight data of the weight data and left vector data of the vector data to generate and output left multiplication/addition result data;

a right multiplication/addition circuit configured to perform a multiplying/adding calculation on right weight data of the weight data and right vector data of the vector data to generate and output right multiplication/addition result data;

an additional adder configured to add the left multiplication/addition result data to the right multiplication/addition result data to generate and output multiplication/addition result data;

a left accumulator synchronized with an odd clock signal to perform an accumulative adding calculation on odd-numbered multiplication/addition result data of the multiplication/addition result data and a left latched data; and a right accumulator synchronized with an even clock signal to perform an accumulative adding calculation on even-numbered multiplication/addition result data of the multiplication/addition result data and a right latched data.

47. The AI accelerator of claim 46, further comprising a clock divider configured to divide a clock signal that is input to the AI accelerator to generate the odd clock signal and the even clock signal and configured to transmit the odd clock signal and the even clock signal to the left accumulator and the right accumulator, respectively.

48. The AI accelerator of claim 47, wherein the clock signal has a cycle that is equal to a CAS to CAS delay time;

wherein the odd clock signal and the even clock signal have a cycle that is equal to twice the CAS to CAS delay time; and wherein the CAS to CAS delay corresponds to an interval time between column addresses.

49. The AI accelerator of claim 48, wherein the additional adder outputs the multiplication/addition result data at an interval time of the CAS to CAS delay time;

wherein the left accumulator receives the odd-numbered multiplication/addition result data at an interval time of twice the CAS to CAS delay time; and wherein the right accumulator receives the even-numbered multiplication/addition result data at an interval time of twice the CAS to CAS delay time.

50. The AI accelerator of claim 49, wherein a first time it takes the left accumulator to perform the accumulative adding calculation, is set to be shorter than twice the CAS to CAS delay time; and wherein a second time it takes the right accumulator to perform the accumulative adding calculation, is set to be shorter than twice the CAS to CAS delay time.

51. The AI accelerator of claim 46, wherein the left multiplication/addition circuit includes:

a left multiplication circuit configured to perform a multiplying calculation on the left weight data and the left vector data to generate and output left multiplication result data; and a left adder tree configured to perform an adding calculation on the left multiplication result data to generate and output the left multiplication/addition result data.

52. The AI accelerator of claim 46, wherein the right multiplication/addition circuit includes:

a right multiplication circuit configured to perform a multiplying calculation on the right weight data and the right vector data to generate and output right multiplication result data; and a right adder tree configured to perform an adding calculation on the right multiplication result data to generate and output the right multiplication/addition result data.

* * * * *